US011416794B2

United States Patent
Bell

(10) Patent No.: US 11,416,794 B2
(45) Date of Patent: *Aug. 16, 2022

(54) EQUIPMENT CONTROL SYSTEM

(71) Applicant: Transportation IP Holdings, LLC, Norwalk, CT (US)

(72) Inventor: David Bell, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 160 days.

This patent is subject to a terminal disclaimer.

(21) Appl. No.: 16/165,746

(22) Filed: Oct. 19, 2018

(65) Prior Publication Data

US 2019/0122154 A1    Apr. 25, 2019

Related U.S. Application Data

(63) Continuation of application No. 15/294,164, filed on Oct. 14, 2016, now Pat. No. 10,169,729, which is a (Continued)

(51) Int. Cl.
*G06Q 10/06* (2012.01)
*G05D 1/00* (2006.01)
(Continued)

(52) U.S. Cl.
CPC ..... *G06Q 10/06314* (2013.01); *G01C 21/206* (2013.01); *G05D 1/0011* (2013.01);
(Continued)

(58) Field of Classification Search
CPC ....... G06Q 10/06313; G06Q 10/06314; G06Q 10/06315; G06Q 50/28; G06Q 50/08; Y02P 90/86; G01C 21/206; G05D 1/0011
See application file for complete search history.

(56) References Cited

U.S. PATENT DOCUMENTS 6,937,992 B1 *  8/2005  Benda ................... G06Q 10/04
                                                        705/7.26
9,358,975 B1 *  6/2016  Watts .................... G05D 1/0214
(Continued)

*Primary Examiner* — Rachid Bendidi
(74) *Attorney, Agent, or Firm* — The Small Patent Law Group LLC; Mary D. Lawlor

(57) ABSTRACT

A system includes transportation vehicles within a facility, an equipment controller, and a communication unit. The communication unit receives signals indicative of component locations within the facility, vehicle locations within the facility, and/or allocation requests for at least one of the components. The equipment controller schedules enactment of the allocation requests based on designated times associated with operations involved in the enactment of the allocation requests and monitors capacities of the transportation vehicles to carry the components within the facility while the transportation vehicles enact the allocation requests. The equipment controller generates signals for movement control of the transportation vehicles in order to combine the components for the allocation requests in at least one of the transportation vehicles. The transportation vehicles move the components within the facility as combined in the at least one of the transportation vehicles to enact the allocation requests according to the enactment that is scheduled.

20 Claims, 28 Drawing Sheets

Related U.S. Application Data continuation-in-part of application No. 14/027,332, filed on Sep. 16, 2013, now abandoned.

(60) Provisional application No. 61/703,795, filed on Sep. 21, 2012.

(51) Int. Cl.
*G01C 21/20* (2006.01)
*G06Q 10/08* (2012.01)
*G06Q 50/28* (2012.01)

(52) U.S. Cl.
CPC . *G06Q 10/06313* (2013.01); *G06Q 10/06315* (2013.01); *G06Q 10/08* (2013.01); *G06Q 50/28* (2013.01)

(56) References Cited

U.S. PATENT DOCUMENTS

| | | | | |
|---|---|---|---|---|
| 2005/0278062 A1* | 12/2005 | Janert | ............... | G06Q 10/08 700/214 |
| 2007/0198174 A1* | 8/2007 | Williams | ........... | G06Q 10/0833 705/1.1 |
| 2009/0222129 A1* | 9/2009 | Waddington | ..... | G06Q 10/08355 700/216 |
| 2011/0095940 A1* | 4/2011 | Breed | ................... | B60C 11/24 342/146 |

* cited by examiner

| | | | | | | | | | | | |
|---|---|---|---|---|---|---|---|---|---|---|---|
| Home | Manage yards | Interchanges | | | | | | | ⏻ Welcome Back rcytst | Road: | RMIQ |
| Manage yards | Selection | Color coding | | | | | | | | | Parking lot |

View: ATLANTA ▽  
Station: ATLANTA ▽    Track ▽    Save view | Create view    Commodity ▽    ☐ Show only  
Block to:    Switch to    Equip init    Equip number

Totals: 45 cars 3,353 Tons 2,491 Length(Feet)

| ☐ Station ▽ | Track ▽ | Seq ▽ | Initial ▽ | Number ▽ | LE ▽ | Commodity ▽ | Kind ▽ | SH ▽ | AI ▽ | Switch to | ▽ |
|---|---|---|---|---|---|---|---|---|---|---|---|
| ATLANTA | ADMCORN | 1 | ADMX | 49050 | L | CORN | C1 | | SW | ADMCORN | ATL |
| ATLANTA | ADMCORN | 2 | ADMX | 49111 | L | CORN | C1 | | SW | ADMCORN | ATL |
| ATLANTA | ADMCORN | 3 | ADMX | 49137 | L | CORN | C1 | | SW | ADMCORN | ATL |
| ATLANTA | ADMCORN | 1 | ADMX | 49169 | E | EMPTY | C1 | | SW | AGNTCSXT | ATL |
| ATLANTA | ADMCORN | 2 | ADMX | 49174 | E | EMPTY | C1 | | SW | AGNTCSXT | ATL |
| ATLANTA | ADMCORN | 3 | ADMX | 49181 | E | EMPTY | C1 | | SW | AGNTCSXT | ATL |
| ATLANTA | ADMCORN | 4 | ADMX | 49185 | E | EMPTY | C1 | | SW | AGNTCSXT | ATL |
| ATLANTA | ADMCORN | 5 | ADMX | 49186 | E | MINING MACHS | F1 | | SW | | |
| ATLANTA | CARGIL | 1 | HTTX | 93881 | L | | | | | | |
| ATLANTA | CARGIL | 2 | NCIX | 7013 | L | GRAIN NEC | C2 | | AP | AGNTCSXT | ATL |
| ATLANTA | CARGIL | 3 | MP | 642926 | E | GRAIN NEC | E5 | | AP | CARGIL | ATL |

FIG. 5A

| Home | Manage yard | RTT | Connecting railroad | Product inventory | Inspections | Bill of lading | | | Facility: Intercontinental terminal houston |
|---|---|---|---|---|---|---|---|---|---|

Color coding

Railcar list view                                                                                            □ Parki... ✗

View [--Please select-- ▽] [Save views] [Create view]

Yard [All ▽]                Track [All ▽]              Equip init [          ]   Equip number [          ]   To [          ]

Products [20/40 FRAC SAND ◁]  Equipment [All correct hooray ◁]   Min Weight [          ]   Max weight [          ]   All ▽
         Acetone             groups    Free runners
         Acrylic acid                  Hoppers 1                 Hazardous □
         Argon ▽                       New group ▽               [Search] [Reset]

Drag a column header and drop it here to group by that column

| ☐ | Days online ▽ | Railcar ▽ | LE ▽ | Yard ▽ | Track ▽ | Seq ▽ | Product ▽ | Weight ▽ | Kind ▽ | Equip group ▽ |
|---|---|---|---|---|---|---|---|---|---|---|
| ☐ | 133 | GATX-029801 | L | 1 | 2JET | 1 | Methanol | 100... | | Free runners |
| ☐ | 228 | CTCX-731956 | L | 1 | 776 | 1 | Methanol | 90.0... | | Permanent cars |
| ☐ | 224 | NATX-300406 | L | 1 | 776 | 2 | Plastic pellets | 1.00... | | Permanent cars |
| ☐ | 224 | PROX-040716 | L | 1 | 776 | 4 | Orange juice | 1.12... | | Permanent cars |
| ☐ | 222 | PLMX-030120 | L | 1 | 776 | 5 | Plastic pellets | 4.00... | | Permanent cars |
| ☐ | 228 | UTLX-206656 | E | 1 | 776 | 7 | | | | Permanent cars |
| ☐ | 223 | GATX-098847 | E | 1 | 776 | 8 | | | | Permanent cars |

Facility: Intercontinental terminal houston

| Home | Manage yard | RTT | Connecting railroad | Product inventory | Inspections | Bill of lading |

Color coding

Railcar list view

☐ Park...

View --Please select-- ▽  Save views  Create view

Yard All ▽

Products: 20/40 FRAC SAND / Acetone / Acrylic acid / Argon

Track All ▽

Equipment groups: All correct hooray / Free runners / Hoppers 1 / new group

Equip init [ ]  Equip number [ ]  To [ ]

Min weight [ ]  Max weight [ ]

Hazardous ☐  All ▽

[Search] [Reset]

Drag a column header and drop it here to group by that column

| ☐ | Days online ▽ | Railcar ▽ | LE ▽ | Yard ▽ | Track ▽ | Seq ▽ | Product ▽ | Weight ▽ | Kind ▽ | Equip group |
|---|---|---|---|---|---|---|---|---|---|---|
| ☐ | 223 | CHVX-100141 | L | 1 | 776 | 24 | Acetone | 180... | | Free runners |
| ☐ | 174 | TEST-4 | L | 1 | JET 9 | 1 | Argon | 159... | | new group |
| ☐ | 185 | CTCX-731703 | L | Houston Yd | 778 C-1 | 5 | MIXED | 23 G... | | Free runners |
| ☐ | 223 | PLCX-129103 | L | Houston Yd | 786 | 1 | Acetone | 12.0... | | Free runners |
| ☐ | 137 | TEST-000076 | L | Houston Yd | 786 | 5 | Acetone | 122... | | Free runners |
| ☐ | 185 | CTCX-731705 | L | Houston Yd | 786 | 6 | Acetone | 11.0... | | Free runners |
| ☐ | 185 | ECUX-371024 | L | Houston Yd | 786 | 7 | MIXED | 23 G... | | Free runners |

Railcar list view

Color coding: Color coded by LE status: LE and W

Facility: Intercontinental terminal houston

| Home | Manage yard | RTT | Connecting railroad | Product inventory | Inspections | Bill of lading |
|------|-------------|-----|---------------------|-------------------|-------------|----------------|

View: --Please select-- ▽ | Save views | Create view

Yard: All ▽ | Track: All ▽

Products: 20/40 FRAC SAND / Acetone / Acrylic acid / Argon

Equipment groups: All correct hooray / Free runners / Hoppers 1 / new group

Equip init: [ ]  Equip number: [ ]  To: [ ]
Min weight: [ ]  Max weight: [ ]
Hazardous ☐  All ▽

[Search] [Reset]

☐ Park... ✕

Drag a column header and drop it here to group by that column

| Days online ▽ | Railcar ▽ | LE ▽ | Yard ▽ | Track ▽ | Seq ▽ | Product ▽ | Weight ▽ | Kind ▽ | Equip group |
|---|---|---|---|---|---|---|---|---|---|
| 133 | GATX-029801 | L | 1 | 2 JET | 1 | Methanol | 100... | | Free runners |
| 228 | CTCX-731956 | L | 1 | 776 | 1 | Methanol | 90.0... | | Permanent cars |
| 224 | NATX-300406 | L | 1 | 776 | 2 | Plastic pellets | 1.00... | | Permanent cars |
| 224 | PROX-040716 | L | 1 | 776 | 4 | Orange juice | 1.12... | | Permanent cars |
| 222 | PLMX-030120 | L | 1 | 776 | 5 | Plastic pellets | 4.00... | | Permanent cars |
| 228 | UTLX-206656 | E | 1 | 776 | 7 | | | | Permanent cars |
| 223 | GATX-098847 | E | 1 | 776 | 8 | | | | Permanent cars |

FIG. 9B

Inbound railcars into facility

Facility [HOUSTON ▷] Inbound date [6/7/2012] Time [13:45]

Yard [South yard ▷] Track [BNSF Int ▷] Connecting railroad [BNSF ▷]

| Select | Subfleet | Init | Number | L/E | Product | Customer | Quantity | |
|---|---|---|---|---|---|---|---|---|
| ☐ | TAUBER | ACFX | 84922 | L ▷ | PET LUB OIL ▷ | ▷ | 162194 | 1st Pounds ▷ |
| ☐ | FREEMTY | CITX | 220122 | E ▷ | XYLENES ▷ | TAUBER ▷ | 0 | Pounds ▷ |
| ☐ | FREEMTY | CTCX | 731140 | E ▷ | XYLENES ▷ | TAUBER ▷ | 0 | Pounds ▷ |
| ☐ | AMOCO | GATX | 80011 | L ▷ | METHANOL ▷ | ▷ | 125140 | 1st Pounds ▷ |

[Confirm inbound] [Cancel]

FIG. 11

Load a railcar

| Loading date | 6/7/2012 | Time | 13:45 | | | |
|---|---|---|---|---|---|---|

| S | Init | Number | Yard | Track | Product | Weight |
|---|---|---|---|---|---|---|
| ☐ | BNSF | 102933 | 1 | LOADING | Prd ▷ | wg 0  ▷ Pounds ▷ |
| ☐ | NS | 465247 | 1 | LOADING | Prd ▷ | wg 0  ▷ Pounds ▷ |
| ☐ | CSXT | 9382 | 2 | TAUBER | Prd ▷ | wg 0  ▷ Pounds ▷ |

Confirm load   Cancel

List products

Search
Name: [        ]

[Insert] [Delete]

Show [Active ▽]
     [Inactive]
     [All]

[Search]

| Select | Edit | Name | Description | | | | | | | |
|---|---|---|---|---|---|---|---|---|---|---|
| ☐ | Edit | Flowers | Lots of flowers | Active | | | | | | |
| ☐ | Edit | Frac sand | Frac sand | Active | | | | | | |
| ☐ | Edit | Sand | Playground sand | Active | | | | | | |
| | | | | | | | | | | |
| | | | | | | | | | | |
| | | | | | | | | | | |
| | | | | | | | | | | |
| | | | | | | | | | | |

Equipment groups

[Double-click to edit]

[Insert] [Delete]

| Select | Edit | Name | |
|---|---|---|---|
| ☐ | Edit | ABCARS | Active |
| ☐ | Edit | FREECARS | Active |
| ☐ | Edit | TOLUENE | Active |
| | | | Inactive |

Equipment kinds

| Select | Edit | Abbreviation | DESCRIPTION | | Active |
|---|---|---|---|---|---|
| ☐ | Edit | B | BOXCARS | | Active |
| ☐ | Edit | H | HOPPER CARS | | Active |
| ☐ | Edit | G | GONDOLAS | | Inactive |
| | | | | | |
| | | | | | |
| | | | | | |
| | | | | | |

[Insert] [Delete]

Location detail — 1600

Area: My Piles
Name: Iron pellets
Description: Iron pellets pile
Location type: Pile
Capacity max:
Unit of measure: Tons
Capacity min:
Customer: The large iron company
Product: Iron pellets ☑ Active Last modified user : RMITESTING    Date: 5/20/2012 13:46

[Save]  [Save and close]  [Cancel]

FIG. 16

| Home | Manage yard | Interchanges | RTT | Connecting railroad | | Welcome back: itc1rcy | Logout | Facility: Houston |

Edit security groups

[Save] [Save and close] [Delete] [Cancel]

There are 3 user(s) in this group. You must first remove all users from this group -to enable group deletion.

Security group title: [Full access]

- ☑ Home
  - ☑ Setup
- ☑ Administer security
- ☑ Edit color schemes
- ☑ Edit customers
- ☑ Edit products
- ☑ Edit yard/track
- ☑ Edit area/location

- ☑ Interchanges
  - ☐ Inbound consists - view only
  - ☑ Inbound consists
  - ☑ Outbound consists
  - ☑ Outbound consists - view only
  - ☑ Outbound consists add new interchange

- ☑ Take action
  - ☑ Bad order - In (BADO)
  - ☑ Bad order - Out (DFRM)
  - ☑ Move (LOC/LOCP/WHL)
  - ☑ Placement - action (PACT)
  - ☑ Placement - constructive (PCON)
  - ☑ Release actual placement (RLS)
  - ☑ Release constructive placement (RCPL)
  - ☑ Shop-in (SHIN)
  - ☑ Shop-out (SHOT)
  - ☑ Storage-in (STEA)
  - ☑ Storage-Out (OSTH)
  - ☑ Turn (TURN)
  - ☑ Unload (UNLD)

- ☑ Connecting railroad
  - ☑ Inbound cars
  - ☑ Onhand cars
  - ☑ Outbound billed cars
  - ☑ Pending actions cars
  - ☑ Outbound unbilled cars
  - ☑ En route

- ☑ Waybill
  - ☑ Print waybill
  - ☑ Edit waybill

- ☑ Manage yard
  - ☐ Map view - view only
  - ☐ Edit map view
  - ☐ Yard view - view only
  - ☐ Edit yard view
  - ☐ List view - view only
  - ☐ Edit List view

- ☑ RTT
  - ☑ RTT

FIG. 18

| Home | Manage yard | Interchanges | RTT | Connecting railroad | Welcome back: itc1rcy | Logout | Facility: Houston |

Create/edit color scheme

Shceme type: Commodity ▽
Name: Commodity ▽
Access type: Shared ▽

Colors assigned:
- 1-Hexene
- Additives, fuel
- Butyl acrylate,
- Butylene
- Combustible LIQ
- CRS,RWY FRT,NN
- Denatured alcoh
- Diethylene
- Elevated temper
- Flammable liqui
- Gasoline
- Isopropanol
- Lube oil
- Methanol
- Petro oil,NEC
- Petroleum DISTI
- Tank cars,CLND
- Toluene Assign | Unassign Hex #1D2160

Unassigned commodity:
Tripropylene

Save | Save & exit | Cancel

EQUIPMENT CONTROL SYSTEM

CROSS-REFERENCE TO RELATED APPLICATIONS

This application is a continuation of U.S. patent application Ser. No. 15/294,164, filed on 14 Oct. 2016, which is a continuation-in-part of U.S. patent application Ser. No. 14/027,332, filed on 16 Sep. 2013, which claims priority to U.S. Provisional Patent Application No. 61/703,795, filed on 21 Sep. 2012. The entire disclosures of these patent applications are incorporated herein by reference.

FIELD

The subject matter disclosed herein relates to systems that control movements of vehicles.

DISCUSSION OF ART

A facility may have components (e.g., parts or raw materials) and equipment (e.g., storage containers, rail cars, on-site transportation vehicles) located throughout one or more buildings or locations which are to be controlled in various ways (e.g., moved, loaded, unloaded, stacked, linked, assigned). Keeping track of the components and equipment, and the status of the components and equipment in a facility (and during transportation between facilities) can be challenging.

BRIEF DESCRIPTION

In one embodiment, a system includes plural transportation vehicles within a facility and an equipment controller comprising one or more processors and a communication unit operatively coupled to the one or more processors. The communication unit is configured to receive first signals indicative of component locations of components within the facility, second signals indicative of one or more vehicle locations of the transportation vehicles within the facility, and third signals indicative of allocation requests for at least one of the components from different remote locations. The equipment controller is configured to schedule enactment of the allocation requests based on designated times associated with one or more operations involved in the enactment of the allocation requests and to monitor capacities of the transportation vehicles to carry the components within the facility while the transportation vehicles enact the allocation requests. The equipment controller is configured to generate signals for movement control of the transportation vehicles in order to combine the components for the allocation requests of the different remote locations in at least one of the transportation vehicles. The transportation vehicles are configured to move the components within the facility as combined in the at least one of the transportation vehicles to enact the allocation requests according to the enactment that is scheduled.

In one embodiment, a system includes a communication unit and one or more processors operatively coupled to the communication unit. The communication unit is configured to receive first signals indicative of component locations of components within a facility, second signals indicative of vehicle locations of transportation vehicles within the facility, and third signals indicative of allocation requests for at least one of the components from different remote locations. The one or more processors are configured to schedule enactment of the allocation requests based on designated times associated with one or more operations involved in the enactment of the allocation requests and to monitor capacities of the transportation vehicles to carry the components within the facility while the transportation vehicles enact the allocation requests. The one or more processors are configured to direct at least one of the transportation vehicles to combine the components for the allocation requests of the different remote locations in the at least one of the transportation vehicles. The transportation vehicles can be configured to move the components within the facility as combined in the at least one of the transportation vehicles to enact the allocation requests according to the enactment that is scheduled.

In one embodiment, a system includes one or more processors configured to determine locations of components within a facility and capacities of equipment to move the products within the facility. The one or more processors also are configured to schedule movement of the equipment in order to move the components from a location in the facility to one or more vehicles scheduled for outbound travel from the facility. The one or more processors are configured to monitor locations of the equipment and the capacities of the equipment as the equipment moves the components to the one or more vehicles. The one or more processors also are configured to receive input from a user to remotely control movement of the equipment.

BRIEF DESCRIPTION OF THE DRAWINGS

Reference is made to the accompanying drawings in which particular embodiments of the inventive subject matter are illustrated as described in more detail in the description below, in which:

FIGS. 5A and 5B illustrate additional embodiments of display screens of a list view of a S/R facility generated by the system shown in FIGS. 1A and 1B;

FIGS. 6A and 6B illustrate additional embodiments of display screens showing how to sort and filter using the list view of FIGS. 5A and 5B;

FIGS. 9A and 9B illustrate additional embodiments of display screens showing the color coding of equipment and products in the list view of FIGS. 5A and 5B;

FIG. 11 illustrates one embodiment of a display screen generated by the system shown in FIGS. 1A and 1B showing information associated with providing interchange support of inbound equipment into the S/R facility;

FIG. 12 illustrates one embodiment of a display screen generated by the system shown in FIGS. 1A and 1B showing information associated with loading equipment within the S/R facility;

FIG. 13 illustrates one embodiment of a display screen generated by the system shown in FIGS. 1A and 1B showing information associated with a product master list;

FIG. 14 illustrates one embodiment of a display screen generated by the system shown in FIGS. 1A and 1B showing information associated with an equipment group master list;

FIG. 15 illustrates one embodiment of a display screen generated by the system shown in FIGS. 1A and 1B showing information associated with an equipment kind master list;

FIG. 16 illustrates one embodiment of a display screen generated by the system shown in FIGS. 1A and 1B showing information associated with a location (e.g., storage area) master list;

FIG. 18 illustrates one embodiment of a display screen generated by the system shown in FIGS. 1A and 1B for security and user setup;

FIG. 19 illustrates one embodiment of a display screen generated by the system shown in FIGS. 1A and 1B for a color scheme setup;

DETAILED DESCRIPTION

Figure 1A:
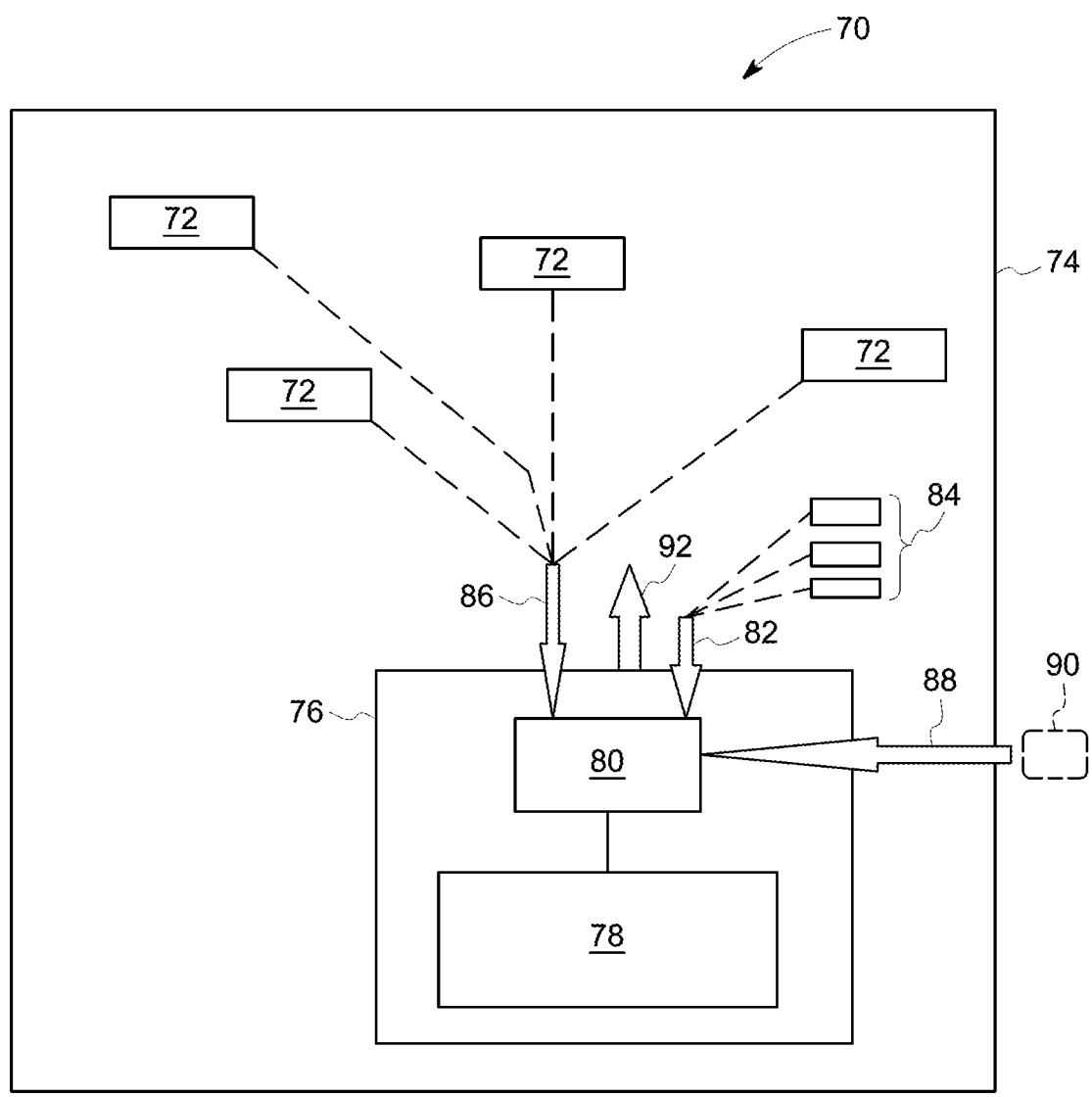
FIGS. 1A and 1B illustrate a schematic block diagram of one embodiment of an equipment control system to visually and graphically manage products, equipment, and activities within and between shipper and receiver facilities.

Systems for controlling movements of vehicles to move and manage components and equipment within and between facilities (such as plants, yards, ports, warehouses, or lots) are provided herein.

The subject matter disclosed herein relates to systems for controlling equipment, components, storage, and transportation within and between facilities. Embodiments of the inventive subject matter relate to systems for controlling movements of vehicles in order to manage components and equipment within and between facilities.

Some operators (e.g., shippers) may be concerned with a production process and where to place a component (e.g., product) after the component has been manufactured. For example, produced material may be in the form of bulk product (e.g., chemicals) and may be placed in a storage container. Some operators use specific vehicles (e.g., rail cars, trailers, etc.) as storage containers in addition to other transportation vehicles. Therefore, when material is produced, an operator may ensure that the vehicles are present to accept the component. An operator may desire to keep track of component inventory in the facility to support dispatching component out to remote locations (e.g., customers) and may further desire to track the component all the way to a destination point during shipping to a remote location (e.g., a receiver).

Other operators (e.g., receivers) are concerned with inventory and knowing how much component is on hand and how many days of production can be supported. Receivers are also concerned with inbound deliveries of materials and component including how much component is on its way, how far away the component is, and how many days out the component is. An operator or receiver works closely with, for example, a transportation carrier such that component ends up where the component is supposed to be on time. In accordance with an embodiment, communication between an operator or receiver and a transportation carrier takes place via electronic data interchange (EDI) communications.

A component includes materials provided by an entity to a consumer. Components may be manufactured (e.g., produced from other inputs) or distributed without modification. Thus, with respect to a single entity, a component may be what the entity sells or exchanges for value in return. A component may be any material or good that may be transported. A material may include an input used in a component, or other matter incident to production or operation of a facility. Components and/or materials may be combined, blended, mixed, and so forth, in various schemes (e.g., loaded on the same equipment but boxed differently, loaded on the same equipment but easily segregated as with chunks of ore and large logs, loaded on same equipment and mixed, as with different ores that may be combined in an alloy, and so forth). A component may be a material or vice-versa to different entities within a supply chain or within the same entity. An inventory may be a quantity of component, material, or other matter. An inventory refers to an amount in a facility, but may also include amounts throughout an entity or enterprise, or amounts that may be otherwise available for the purposes of the inventory (e.g., for production, for sale to consumers, and others). There may be inventories of other items (e.g., equipment).

Components, inventories, and other aspects may exist (e.g., as a discrete item, in particular quantities) at locations (e.g., within a plant, on tracks between buildings, in a truck between a shipper and a receiver). Locations may be absolute (e.g., latitude/longitude value), relative (e.g., located at a known position in a plant), and/or combinations thereof. Components, inventories, and other aspects may be repositioned, resulting in their location being changed. Repositioning may be effected, for example, to stage components for use or shipment, to prioritize or order a plurality of inventories, to create space for other components or the performance of operations, and other reasons.

A shipper includes an entity in the business of shipping components via some form of transportation (e.g., via trucks in an on-highway fleet or rail cars on a railroad). A shipper may be in the business of producing, mining, or processing the component (e.g., coal) to be shipped. A receiver includes an entity in the business of receiving components from shippers via some form of transportation (e.g., via tractor trailers). A receiver may or may not also be in the business of using or further processing the component (e.g., plastic pellets).

Containers and trailers include storage media or areas configured to hold components, goods, or other shippable or receivable materials. These aspects may be examples of equipment. A shipper or receiver (S/R) facility includes a facility, location, site, or area where components and equipment may be managed. An S/R facility may include a facility of a shipper, a receiver, or both. The managing of components and equipment may include, for example, moving, loading, unloading, storing, stacking, linking, assigning, shipping, and receiving the components and equipment. Equipment includes anything that may be managed in the S/R facility or between S/R facilities. Examples of equipment include, but are not limited to, rail cars; trailers; ships; cranes; lifts; other shipping transportation vehicles; storage containers or storage areas for storing components or other equipment; containers/trailers that may be loaded/unloaded with component and loaded/unloaded from rail cars, ships, or other shipping transportation vehicles; or transportation vehicles for moving, loading, and unloading components within the S/R facility. When in use in support of or assigned to an allocation request, maintenance, et cetera, at least a portion of equipment may be non-available (e.g., cannot be assigned for that time period to another allocation request).

Equipment may be operated by one or more entities, meaning a particular entity owns, possesses, uses, conveys, maintains, performs, or is responsible for various other aspects related to equipment. Private equipment may include equipment owned or operated by a third party other than the shipper. A private fleet includes a fleet of equipment (e.g., many items of equipment) owned or operated by the third party.

As with components and inventories, equipment may have locations, and may be repositioned between locations. Equipment may be released to other entities, which may refer to the administrative process(es) used to provide possession of equipment to an entity that may perform a function involving the equipment (e.g., conveyance, maintenance, loading). Alternatively, releasing may can refer to permission or conditions set to advance through a workflow or an allocation request fulfillment (e.g., released from shipper to depart for receiver).

An equipment class may be equipment associated with one or more characteristics. For example, rail cars may be an equipment class among all equipment, and tanker railcars may be an equipment class (or sub-class) among railcars. In embodiments, an equipment class refers to all equipment sharing one or more characteristics. For example, equipment that holds components (e.g., rail cars, containers, trailers, etc.) may be one equipment class, equipment that is capable of moving components (e.g., rail cars, trailers, locomotives, automobiles, mining vehicles, cranes, lifts, etc.) may be another equipment class, equipment that is capable of moving (e.g., rail cars, trailers, locomotives, automobiles, mining vehicles, etc.) may be another equipment class, equipment that is capable of moving components while remaining stationary (e.g., cranes, lifts, etc.) may be another equipment class, etc. In embodiments, an equipment class refers to a particular model of identical equipment. In embodiments, a single equipment may belong to two or more classes or sub-classes.

Equipment may relate to target and/or maximum daily equipment loadings. A target daily equipment loading may relate to an optimal, minimum, or "non-exigent" (e.g., barring unusual circumstances) number of loadings performed by the equipment (e.g., the placing of components into storage, removal of components out of storage, moving components from one location to another, etc.). Loading may be measured in numbers of equipment or components, and there may be target loadings for particular classes of equipment, or equipment may be weighted or treated differently in a composite target loading. A maximum daily loading may be a number which should not be exceeded with respect to equipment related to a facility, enterprise, or a subset thereof.

Equipment may have modifying terms associated with them. For example, equipment may be owned by a shipper, and the shipper may abide various governmental or third party regulations that may be supplemented with internal policies, support or warranty guidance, and other aspects. Alternatively, equipment can be owned by a third party who may lease, rent, finance, lend, et cetera, some of the equipment to a shipper. Various contract terms related to uses, maintenance and tax liabilities, other associated entities (e.g., repair shops), routes used, and so forth may govern the use of the equipment. The actual use of equipment may be what may be actually done with the equipment (e.g., actual work performed by the equipment), and may be in fulfillment or violation of the equipment terms (e.g., contract terms).

An entity may be any individual, group, or business involved in the transfer of materials (e.g., components). In embodiments, entities may belong to or control other entities (e.g., as in parents and/or subsidiaries). If two or more entities may be discussed, the two entities represent distinct parties not sharing all resources such that some exchange occurs when resources transfer from one entity to the other. While this refers to some combination of components, materials, and money flowing between the two entities according to valuation of portions of the combination in terms of other portions of the combination, it may be appreciated that various other incentives (e.g., development of goodwill, sampling, and others) and/or deferment of a portion of a deal (e.g., consignment, exchange, advance credit, and others) may be involved in the exchange. A consumer may be an entity that consumes or utilizes a component from an upstream entity. Other examples of entities herein may include (but may not be limited to) shippers, receivers, producers, private fleets and/or private fleet managers, repair shops and/or other business entities related to some aspect of transactions, and others.

A transfer may include any movement of component, material, equipment, and/or other matter. While transfers may be described in terms of external exchanges between entities, transfers may occur within a single entity (e.g., material transferred from one equipment to other equipment, from one location to another, from one business to another, and so forth). Transfers between a single entity may occur, for example, to facilitate production, efficient utilization of equipment or space, staging for an outgoing shipment, to accommodate an incoming shipment, and other reasons. Multiple transfers and re-transfers may be cognized under a singular transfer, such as when a material may be conveyed through multiple points or nodes within one or more entities before being utilized in whole or part.

An allocation request (e.g., order) may include a request for one or more components and/or materials. An allocation request may be enacted, fulfilled, or completed through (or may otherwise be related to) one or more exchanges or transactions between two or more entities. In embodiments, an allocation request may be completed through (or may otherwise be related to) one or more exchanges or transactions within a single entity (e.g., between business units, between facilities, for accounting purposes, and so forth). One or more allocation request statuses may be associated with an allocation request. Allocation request statuses may include information relevant or of interest to any entity with interest or involvement in the allocation request, such as exchange amounts (e.g., component/material quantities, money for component/material, other fees), shipment timing, delivery timing, payment timing, equipment associated with the allocation request, and others. Allocation request statuses may be updated based on processing or fulfillment. For example, allocation request statuses may be updated to indicate an allocation request has been received, an allocation request has been forwarded for fulfillment, at least a portion of the allocation request may be being fulfilled (e.g., being picked or loaded), at least a portion of the allocation request may be shipped, at least a portion of the allocation request may be fulfilled, and so forth. Allocation request status updates may refer to a specific portion or parties related to the portion (e.g., a particular line involved with a particular component) or the allocation request at large. These examples may be to be construed as providing non-exhaustive details related to the spirit of allocation request statuses (and allocation requests), and other details or status information may be provided herein.

Allocation requests may be scheduled, such that allocation requests may be planned for fulfillment and at least one instruction or resource may be in place to the accomplishment of such ends. Sets of allocation requests may be scheduled to manage a plurality of allocation requests and de-conflict (e.g., ensure no aspects related to the allocation request such as component quantities or equipment may be being used in support of another allocation request, may be assigned to be used in support of another allocation request during a period of time, or may be otherwise unavailable) the resources or prioritize instructions. New allocation requests may be received and added to the sets or schedules, resulting in various adjustments to the new allocation request, other allocation requests, sets, or schedules.

A workflow includes an order or a progression of aspects (e.g., tasks or other operations) to accomplish an end. For example, a workflow to deliver one or more components may include production of the components from materials, preparation of the components for shipping, and shipment of the components to one or more remote locations (e.g., to customers or other entities). Each aspect may in turn be its own workflow. For example, production may include determining a production quantity, preparing the raw materials, scheduling labor and equipment, and creating the component. A workflow may include one or more operations, and operations may include sub-operations or aggregate to a larger operation. Workflows may facilitate the flow of material (and/or information) or operation accomplishment in a way that minimizes or reduces delay or inefficient use of resources (e.g., relative to one or more other workflows or all other workflows). Workflows may have times associated, such as a previous, average, or predicted time to complete a workflow or portion thereof. Operations may have times associated, and may be added to determine a workflow time based on the operations. Workflows may have associated workflow lists that provide a listing of necessary operations or aspects, and may also (but need not) provide details concerning their relationships, scheduling, and management. A workload may indicate aggregate workflow aspects, operations, or other requirements on an entity or subsets thereof.

Allocation requests (and workflows or operations that relate to one or more allocation requests) may have costs associated. For example, the time, labor, equipment, bandwidth, fuel, and other costs associated with a shipper may be directly attributed to allocation requests or averaged across allocation requests. Thus, both direct and indirect costs may be associated with an allocation request. In embodiments, different means of enacting or fulfilling an allocation request (e.g., different time frames, different routes, different loading combinations, different equipment, and so forth) may result in different costs associated with the allocation request. Allocation request schedules (including, e.g., equipment to be used, routes, timing, and so forth) may be planned or modified in view of costs, including changes to costs based on new or fulfilled allocation requests. Particularly, an allocation request-equipment cost may be one or more costs associated with enacting an allocation request based on the equipment used.

Revenues may also be considered in aspects herein. Revenues may be amounts generated or received based on the sale of goods (e.g., a component itself) or services (e.g., shipment of the component), or through other means. An allocation request-equipment revenue may be an amount of revenue generated based on an allocation request fulfilled at least in part by equipment. Allocation request-equipment revenue may change based on the equipment selected.

Related to aspects described may be one or more shipping solutions, which may include details for enacting an allocation request. The shipping solution may not be complete until relevant components/materials, equipment, resources, workflows, et cetera, may be reserved and de-conflicted with other shipping solutions. Similarly, a shipping plan may be a plan or aspects to enact one or more allocation requests based on costs and equipment. In embodiments, a shipping plan may include scheduling one or more allocation requests.

As used herein, production may be the creation of a component or other process adding value for a downstream or other consumer, but need not be limited to such exclusive definition. For example, in some services, production may refer to the portion of a unit that works for or supports entities outside the unit, and may drive the value of the unit by providing quid pro quo to various entities. A production schedule may be the timing related to the occurrence of production, as well as requirements incident to production (e.g., equipment availability, labor, maintenance, and others). Various schedules related to production or other aspects may be described. In embodiments, a production schedule, or other schedule, may be based on a remote location schedule, e.g., customer schedule. A customer schedule may be based on customer expectations and/or requirements. For example, a customer schedule may be a time at which the customer may expect to receive a component, a time at which the customer may be prepared to receive a component, a time the component may be in accordance with the customer's production or shipment schedule, and others. Allocation request schedules may be schedules including a time of allocation request receipt, projected or actual travel time (ship time), projected or actual receipt time, and so forth.

An equipment availability matrix may be at least a text- or graphics-based informational display that may indicate times that equipment is available and/or is not available. For example, when equipment may be assigned to an allocation request and scheduled to ship, the equipment may be non-available at least until the allocation request may be projected to be complete, and may be non-available until the equipment may return from its trip, be serviced or re-fitted, et cetera. Equipment availability matrices may be based on actual times (current or historical), average times, predicted times, others, and combinations thereof.

A map may be a visual representation of space in a two-dimensional rendering, in a three-dimensional rendering, or in another rendering. Visual characteristics may include the aesthetic and/or functional aspects of appearance in an interface or other aspects. While color-coding may be discussed herein, other aspects such as icons, including the shape, size, opacity, et cetera thereof may indicate particular information. Various icons/images, text, and other symbols may be included in one or more aspects including visual characteristics. Visual characteristics may blend disparate sources to composite images (e.g., cartoon-like icons superimposed over satellite or ground-based photos of facilities or portions thereof) or be uniform in appearance (e.g., wholly computer-generated imagery). Further, other sensory information (e.g., sounds, tactile information) may be utilized in combination with or as a substitution for various visual characteristics.

The software or computer programs described herein include computer readable and/or executable instructions, stored in a non-transitory computer-readable medium, that cause a controller or other electronic device to perform designated functions, designated actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. The form of software may be dependent on, for example, requirements of a desired application, the environment that the software operates on, and/or the desires of a designer/programmer or the like.

The computers, processing elements, or computer devices described herein include, but may be not limited to, any programmed or programmable electronic device that may store, retrieve, and process data. The non-transitory computer-readable media described herein include, but may be not limited to, a CD-ROM, a removable flash memory card, a hard disk drive, a magnetic tape, and a floppy disk. The computer memory, as used herein, refers to a storage device configured to store digital data or information which may be retrieved by a computer or processing element. A controller refers to the circuits/circuitry, logic circuits/circuitry, and/or processing elements (e.g., one or more microprocessors, integrated circuits, and/or field programmable gate arrays), possibly including associated software or program(s) stored in a non-transitory computer-readable medium, that is configured for the managing of equipment and components associated with a facility, as set forth herein. Signals, data, and information may be used interchangeably herein and may refer to digital or analog forms. A communication device may refer to any wired or wireless device (e.g., a computer modem) operable to receive and/or transmit signals, data, or information. Virtual items described herein can refer to the simulation of real world objects and characteristics in a computer environment. A module may be a computer-related component (e.g., software, hardware, combinations thereof, and so forth) providing at least the described functionality. For example, a module may be a software application, a portion of a software application, an electronic device, and/or others.

Some of the systems and methods described herein may be discussed in the context of shippers and receivers using rail cars and railroad transportation. However, embodiments of the inventive subject matter may apply equally well to other types of shippers and receivers using other types of transportation such as, for example, port entities using sea-going vessels, mining equipment, on-road trucks, automobiles, and the like.

In one embodiment, a system may monitor vehicle and container dwell times. Monitoring dwell time may allow control that influences productivity, may reduce or eliminate demurrage charges, may capture vehicle or container inspection information, may report vehicle or container status, may capture a characteristic parameter relating to a component or group of components, or to singular equipment or group of equipment, and may pre-block vehicles and containers for efficient hand off to an operator or carrier. Vehicles and containers may be pre-blocked according to a destination or other parameter. For example, a vehicle system such as a train, a convoy of trucks, a marine vessel pushing or pulling barges, etc., may have a pre-defined number of blocks, and a shipper may communicate with a carrier to assemble a block of rail cars, trailers, or barges to fill a block in the vehicle system.

In embodiments herein, systems and methods may provide inventory and workload management (IWM) functionality. The IWM functionality may be implemented as a separate IWM application (e.g., standalone application or a component of another application) or as an IWM module which may be part of a shipper/receiver management software application (SRMSA) application, in accordance with various embodiments (e.g., see FIGS. 1A and 1B).

The inventory and workload management functionality may provide shippers and receivers with the ability to manage incoming and/or outgoing component and/or material quantities and various equipment. The IWM functionality may enable production planning, determination of allocation request status and fulfillment rates, as well as the ability to manage inventory through a single integrated graphical mapped-based platform. A shipper may be producing component and a receiver may be consuming component (e.g., bulk component such as coal or gravel) and the respective entities may desire to manage the amount of component that has to be produced and shipped, or the amount of component that may be on hand (e.g., in inventory).

Production planning may be facilitated at various levels according to or in conjunction with IWM techniques described herein. In embodiments, one or more IWM modules may interface with, leverage functionality from, and/or supplement functionality to one or more integrated or disparate (e.g., from separate entities) enterprise resource planning systems.

One or more IWM modules may track material and/or component inventory. Inventories may be stored in (or controlled at least in part by) equipment. In embodiments, such equipment may include International Standards Organization (ISO) containers, railcars, bins, silos, piles, tanks, trailers, barges, and other storage devices within a plant or yard, or portions of the plant or yard utilized by such (e.g., storage pad with a pile of material thereon). In various embodiments, equipment may be identified (e.g., individually, in groups, and so forth). Each piece of equipment or group of equipment may have a known capacity for a particular material or component (e.g., dimensions of pile that will fit on storage pad) or for any material or component (e.g., weight limit for center beam railcar, maximum volume for coal railcar).

In accordance with one or more embodiments of the inventive subject matter described herein, the utilized or available capacity of one or more equipment may be monitored. For example, a gondola railcar may be one-third full of a material, or two-thirds empty. Various other aspects may be associated with knowledge of capacity of equipment. For example, loading and unloading time, transport cost at a particular capacity, items compatible or easily separated that may exist within the same equipment, expected movement (e.g., customer, destination, route, timing) and so forth. In this way, equipment may be efficiently allocated to maximize utilization (e.g., of capacity), as well as combine allocation requests or materials in a way that best facilitates inventory and workload management. In another example, a ship may be loaded to 10% of capacity, requiring eight hours to unload. However, a new urgent allocation request may be received, and it may be more profitable to offer current customers receiving at least a portion of the expected loading of the ship a discount for delay rather than delay the urgent allocation request. One or more IWM modules may determine solutions, with and/or without unloading the current cargo, designed to best utilize the ship (as well as other available equipment) to satisfy all customers and maximize or increase profitability for entities involved (e.g., relative to one or more other solutions or all other solutions).

In addition to equipment capacities and capacity utilization, other information regarding materials and/or components stored in each piece of equipment may be maintained on a per-equipment and group bases. For example, the component(s) and/or material(s) stored and respective amounts (as distinguished from total capacity amounts), loading and/or balancing information, location (e.g., in a facility and/or in transit between facilities), special information (e.g., hazardous materials), the value of the equipment with or without components/materials aboard, maintenance or repair information, and other information may be maintained. In embodiments, information about testing certifications associated with one or more stored components may be related to the equipment or component information related to respective pieces of equipment. Embedded functionality may allow for component blending or mixing and monitors component test results (e.g., on a per batch basis) for components requiring certification to facilitate IWM aspects and efficient solutions in support thereof.

Color-coding, or other types of coding, may be employed to graphically inform a user of the status of component and equipment. In embodiments, more than one color code or code may be utilized with each piece of equipment in accordance with IWM techniques disclosed herein.

In embodiments, control of equipment to affect the transfer(s) of material/component from storage devices and/or production to equipment may be managed in support of IWM. This may be performed independent of or in conjunction with tracking of equipment.

In embodiments, one or more IWM modules may allow a user to view how much component has been applied to an allocation request (e.g., loaded and shipped in a particular rail car or trailer), and how much component may enact an allocation request (including a remainder/partial allocation request).

Determinations regarding when to ship a component for an allocation request, based at least on when a component may be due at a receiver, may be provided. In addition, various production planning aspects may be used to determine when to ship a product for an allocation request, or when to move or modify inventories of materials and/or components.

Once loaded, equipment (e.g., rail car, trailer, barge, etc.) may be issued and released (e.g., to a serving entity taking control of the equipment, from a staging area, and others). For example, a rail car may be released to a serving railroad. In embodiments, this function may be automatic (e.g., requiring no operator interaction) using one or more IWM modules based on one or more conditions. In alternative or complementary embodiments, the IWM modules may enable an operator to release a piece of equipment. When dispatched, the equipment may be tracked en route to a destination. Various dispatch information (e.g., predicted ship date, actual ship date, expected transit time, and others) may be viewed for each piece of equipment en route.

One or more embodiments of IWM modules herein may utilize one or more IWM alerts. IWM alerts may be received on the occurrence of particular events related to workload management and requisite inventories. For example, when equipment departs a destination, arrives at a destination, is delayed en route to a destination, and so forth, various alerts indicating fulfillment or changes may be provided. IWM alerts may be used independently or in conjunction with notifications to one or more enterprise resource planning (ERP) systems associated with entities involved in the transaction.

For receivers, embodiments of one or more IWM modules may facilitate tracking of inventory. In embodiments, an IWM module may facilitate real time, en route, continually-updated monitoring of one or more shipments. In embodiments, an IWM module may estimate a time of arrival and plan or suggest timing for production, equipment management, facility maintenance/downtime (e.g., time when production or shipment may be not occurring at least with respect to one line, equipment, et cetera), and other aspects based at least in part on the estimated time of arrival. When equipment arrives at a receiver destination, the transfer of component to storage devices, and/or other vessels (e.g., water-borne or others, in ports or various environments), may be managed and/or monitored.

In accordance with an embodiment, one or more IWM modules may plan and monitor workflows involved throughout the process of receiving, inspecting, cleaning, repairing, moving, loading/unloading equipment as well as the component transfer process. Such tracking and managing may be accomplished from an office environment (e.g., via a desk top computer) or from an integrated application module running on a mobile device (e.g., a smart phone or tablet device).

In a non-limiting example of some aspects related to at least one embodiment of an IWM module, a first company may provide material to a second company, which the second company may use to produce components sold to consumers. Both the first company and second company maintain independent ERP systems, and at least one of the first company and the second company use production planning aspects in conjunction with one or more IWM modules herein.

To provide timely servicing of consumer allocation requests, the second company may ensure its production corresponds flexibly with consumer demand. For example, if the second company cannot keep pace with consumer demand, inventories of the second company may dwindle and the second company may be unable to meet outstanding allocation requests. If the second company outpaces consumer demand, the second company may have an amount of capital pending in inventory, and may run out of equipment or space in which to manage inventory. There may be other costs associated with inefficient production management. Efficient production management may balance inflows and outflows of materials and components. If too much material for future production may be on-hand, equipment, space and capital may be excessively tied in material and potentially create bottlenecks to the efficient storage and movement of completed component. If too little material may be on-hand, resource planning and continuous production flexibility may become constrained while the second company awaits a next delivery from the first company.

The work flow of different companies may be intertwined with each other. If the first company does not maintain carefully forecast, but still flexible, inventory and workflow, the first company may lose the second company or other customers for impacting their business. As with the second company, however, equipment, space, and other resources may be finite, and the first company may also be dependent on other upstream entities, and may be committed to other downstream entities. Thus, the first company may resolve efficient solutions for managing the workflow and material/product inventories of the first company.

Thus, IWM modules as described herein (alone or in combination with one or more ERP systems) may facilitate solutions within a single entity or between a plurality of entities to ensure sound planning related to the movement of materials, components, and/or the equipment associated therewith. Production planning or other functions of one or more IWM modules may be based on, for example, amounts of components and/or materials on-hand, amounts of components and/or materials expected to be received, amounts of components and/or materials expected to be shipped, equipment available at a given time (e.g., currently available, expected to become available, available until a certain time, entering or leaving service with one or more entities, and others) to manage components and/or materials, pending allocation requests, completed allocation requests, expected allocation requests, production rates, other facilities or units of the same entity, other facilities or units of different entities, movement forecasting (including but not limited to changes to movement in view of damaged equipment, weather, disruptions such as route damage, and others), and/or other aspects.

Figure 1B:
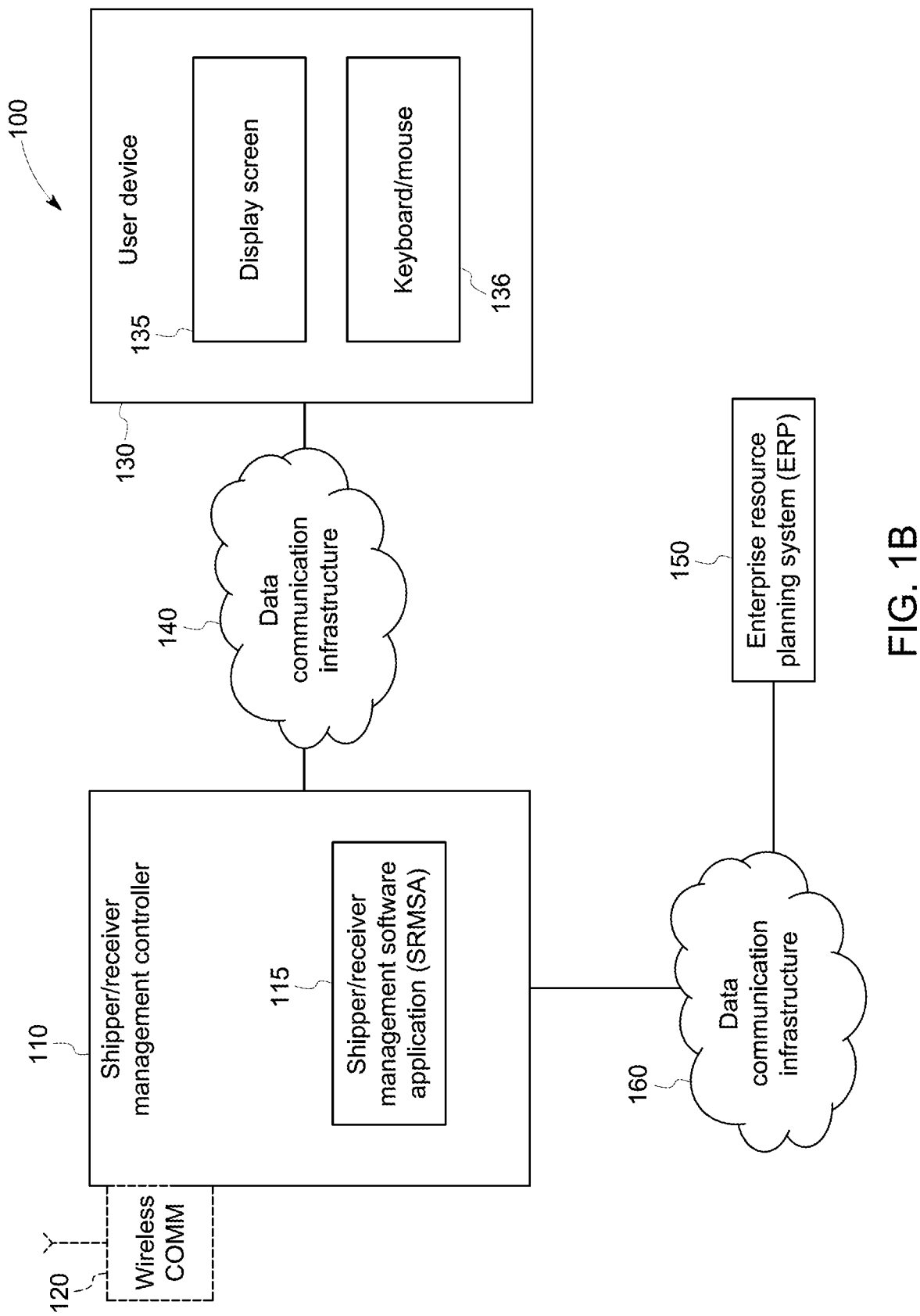
Figure 20:
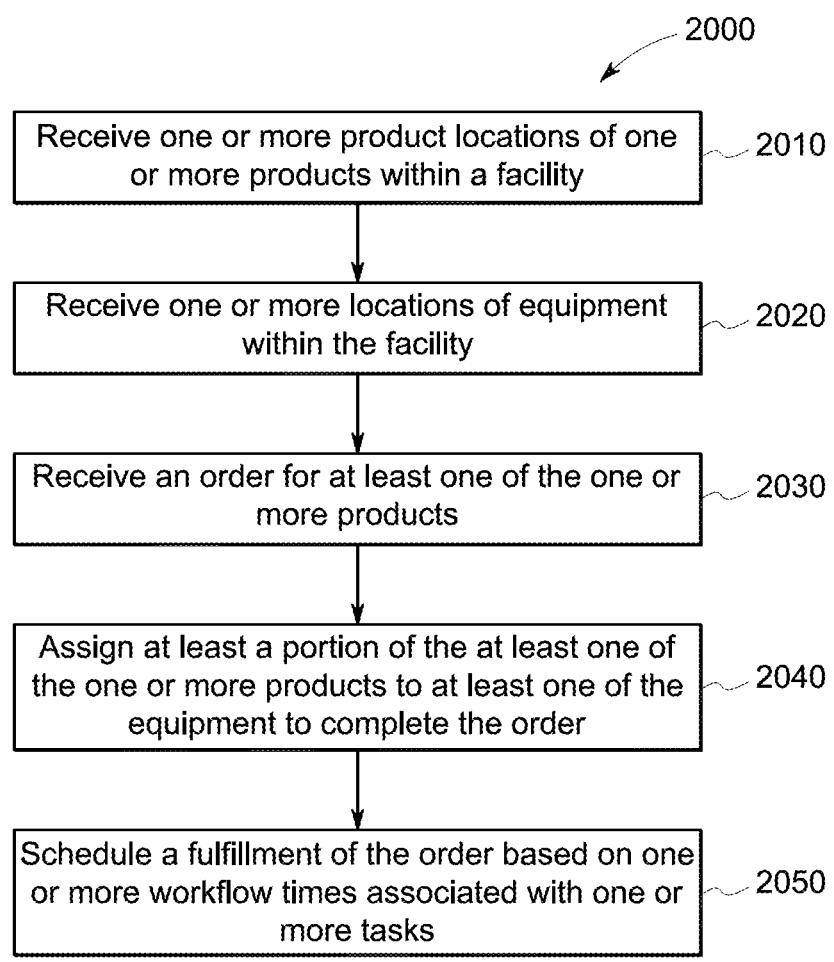
FIG. 20 illustrates a flowchart of an embodiment of a method for enacting an allocation request using the inventory and workload management (IWM) functionality described herein using the system shown in FIGS. 1A and 1B.

FIG. 20 illustrates a flowchart of an embodiment of a method 2000 for controlling equipment to enact an allocation request using the IWM functionality described herein using an equipment control system 100 shown in FIGS. 1A and 1B. Details of the equipment control system are described below. At 2010 of the method 2000, one or more product locations of one or more products within a facility are received (e.g., received at a controller of the equipment control system and having IWM functionality, from an ERP system, which can be accessed by a user device). At 2020, one or more locations of one or more pieces of equipment within the facility are received by the equipment control system. At 2030, an allocation request for at least one of the one or more products is received by the equipment control system. At 2040, at least a portion of the at least one of the one or more products is assigned to at least one of the one or more pieces of equipment to complete the allocation request by the equipment control system. At 2050, a fulfillment of the allocation request is scheduled based on one or more designated times (e.g., workflow times) associated with one or more operations. For example, the equipment control system may generate and communicate signals to equipment to automatically control movement or other operations of the equipment to cause the equipment to enact (or at least partially fulfill) the allocation request. These signals may direct a crane to lift components out of one container and/or into another container, direct a pump to remove a fluid component from one vehicle and/or into another vehicle, direct a vehicle to move a container to a designated location, etc.

Turning now to FIGS. 1A and 1B, a schematic block diagram of an embodiment of the equipment control system 100 is shown. The system may be used to visually manage components, equipment, and activities within and between S/R facilities, as well as to control automatic movement of equipment in allocation request to manage components, other equipment, and activities within and between the S/R facilities. The S/R facility may be, for example, a plant, a yard, a port, a warehouse, or a lot or any location and/or facility where components and equipment may be managed (e.g., moving, loading, unloading, storing, stacking, linking, assigning, shipping, and receiving the equipment and components). Equipment associated with the S/R facility may be loaded or unloaded with component at the S/R facility. Embodiments of the inventive subject matter provide functionality associated with the loading/unloading process and provide integration to the ERP system of a shipper or receiver.

The equipment management system may include a shipper/receiver management controller 110 operable to manage components, equipment, transactions, and activities taking place within the S/R facility. The management controller is operable to control a displayed representation of the S/R facility and components and equipment located in the S/R facility, along with characteristics of the components and equipment. Selectable options may facilitate managing the components and equipment within the S/R facility through a graphical interface. Functionality allowing interfacing with an entity that delivers equipment (e.g., rail cars, trailers, barges, etc.) to the S/R facility may be provided. For example, the equipment management system may respond to a vehicle or container being ready for dispatch by initiating an electronic data interchange (EDI) request. The request may instruct a carrier to come and get the vehicle or container from a shipper's facility. Optionally, the request may cause the vehicle to automatically move to a location to couple with the container and to move the container out of the facility of the shipper. Similarly, if the carrier holds a container for a shipper the EDI request may be made instructing the carrier to deliver the container to the shipper's facility. Integrated inbound and outbound equipment and component visibility may be provided, along with automation of key operations and production of work allocation requests for vehicle crews.

In one embodiment, the management controller may be implemented as a computer server running a shipper/receiver management software application (SRMSA) 115. The controller may manage components and equipment within the S/R facility (e.g., the assignment, loading, unloading, and movement of components and equipment within the S/R facility), and may provide a graphical mapping that allows visualization of the S/R facility by a user on a display screen. The management controller may provide a graphical mapping that supports visualization of transportation equipment, having component loaded thereon, in transit (en route) between S/R facilities along with estimated times of arrival.

As an option, the system may include a wireless communication (COMM) device 120 operably interfacing to the management controller and able to communicate with other wireless devices (e.g., via radio frequency communication) operating within the S/R facility. Such other wireless devices may be hand-held devices used by inspectors, or may be located in on-site transportation vehicles within the S/R facility.

The equipment control system may include a user device 130 (e.g., a desktop personal computer, a hand-held tablet computer, or a mobile telephone) having a user interface including a display screen 135 (e.g., a touchscreen display) and, optionally, a keyboard and/or an electronic mouse 136. The user device may communicate with the S/R management controller either directly or via a data communication infrastructure 140 (e.g., a computer network). The user device may be located in an office on site at the S/R facility, or may be remotely located away from the S/R facility. In accordance with an embodiment, the user device may be a mobile, wireless, touch-screen, hand-held device that may be used by a user as the user walks or drives around the S/R facility (e.g., if the user is part of a maintenance crew). The system may provide a directional locator function, directing a user to a component or equipment within the S/R zone that may be selected by the user.

The equipment control system may include an ERP system 150 in operative communication with the management controller 110 via, for example, a data communication infrastructure 160 (e.g., the Internet). The ERP system may be configured to manage various aspects (e.g., scheduling, tracking, way billing, revenue accounting) of a larger enterprise such as, for example, an entire shipping company having multiple S/R facilities. Therefore, the ERP system may communicate with a plurality of management controllers at a plurality of S/R facilities of a shipper or receiver.

If the management controller is on site at the S/R facility, the user device may communicate in a direct wired manner with the controller, or via a data communication infrastructure that may be a local area network. If the management controller is remotely located from the S/R facility, then communication with the user device may be via a larger network, such as the Internet. For example, the management controller may be co-located with or be implemented on a same server computer as the ERP system. As another example, the management controller may be hosted at a third party site (e.g., a provider of the SRMSA) as a software-as-a-service (SaaS) configuration. As a further example, the data communication infrastructures may be the same network (e.g., the Internet and/or an intranet). Other configurations may be possible as well, in accordance with various other embodiments.

Shipping vehicles may be located throughout the S/R facility, may be loaded or unloaded, and may or may not be linked to a block of, e.g., rail cars to be moved by one or more locomotives of a railroad as a train. In one embodiment, the system provides a graphical interface on a display screen of the user device allowing a user to manage components and equipment in the S/R facility. A user may interact with the management controller via the user interface device to configure the layout of the S/R facility and tracks, paths, or other equipment routes within the S/R facility, for example. The resultant configuration may reflect the current state of the S/R facility, or may reflect a desired state of the S/R facility to be implemented, or may represent both (e.g., using different visual style elements).

A user may then view the location of equipment on equipment routes (e.g., rail cars on tracks; automobiles, trucks, and/or trailers on roads; marine vessels on waterways, aerial drones in flight, etc.) within the S/R facility, check the status of a vehicle or container or other equipment, update (move) the location of the vehicle, container, or other equipment within the S/R facility, and review or enter transportation (e.g., waybill/Bill of Lading) information for the vehicle, container, or other equipment. A user may create if-then logic to help plan and manage equipment movements within the S/R facility. Checking the status of the equipment may involve, for example, checking if a vehicle is loaded and with what component or commodity, checking the identity of the receiver of the loaded commodity, checking the assigned destination of the vehicle, container, or other equipment, and checking the owner (or lessor) of the vehicle, container, or other equipment. Waybill information for the equipment may be checked and bill of lading information entered using the equipment control system of FIGS. 1A and 1B. In one embodiment, the user device may be used to verify tracking information physically associated with the equipment, such as a radio-frequency identification (RFID) or automatic equipment identification (AEI) tag, or a barcode, or the like. That user device might scan the associated indicia and match it against the status information. The user may make updates or corrections to errors on the spot.

A method is provided in one embodiment that includes obtaining shipping or receiving information associated with components and equipment located within the S/R facility. The obtained shipping or receiving information may be processed for the generation of displayed graphical representations of the components and equipment located within the S/R facility. This may be done along with characteristics of the components and equipment. Selectable options may be then provided to a user for reviewing and editing the shipping or receiving information.

The obtained shipping or receiving information may be processed for the generation of displayed graphical representations of the components and equipment en route (in transit) between two or more S/R facilities. The processed shipping information may be passed to others, such as carriers, to facilitate transportation services. This information passing may be done, for example, via EDI communications. The graphical representations may be displayed as graphical icons and/or text information. The shipping or receiving information may be obtained from an enterprise resource planning system and may include bill of lading or waybill information. An analytic dashboard may provide status overviews on planning and productivity measures. Configurable role-based views may allow a user to make strategic decisions to manage upcoming work, optimize capacity, and reduce operating costs.

Figure 2A:
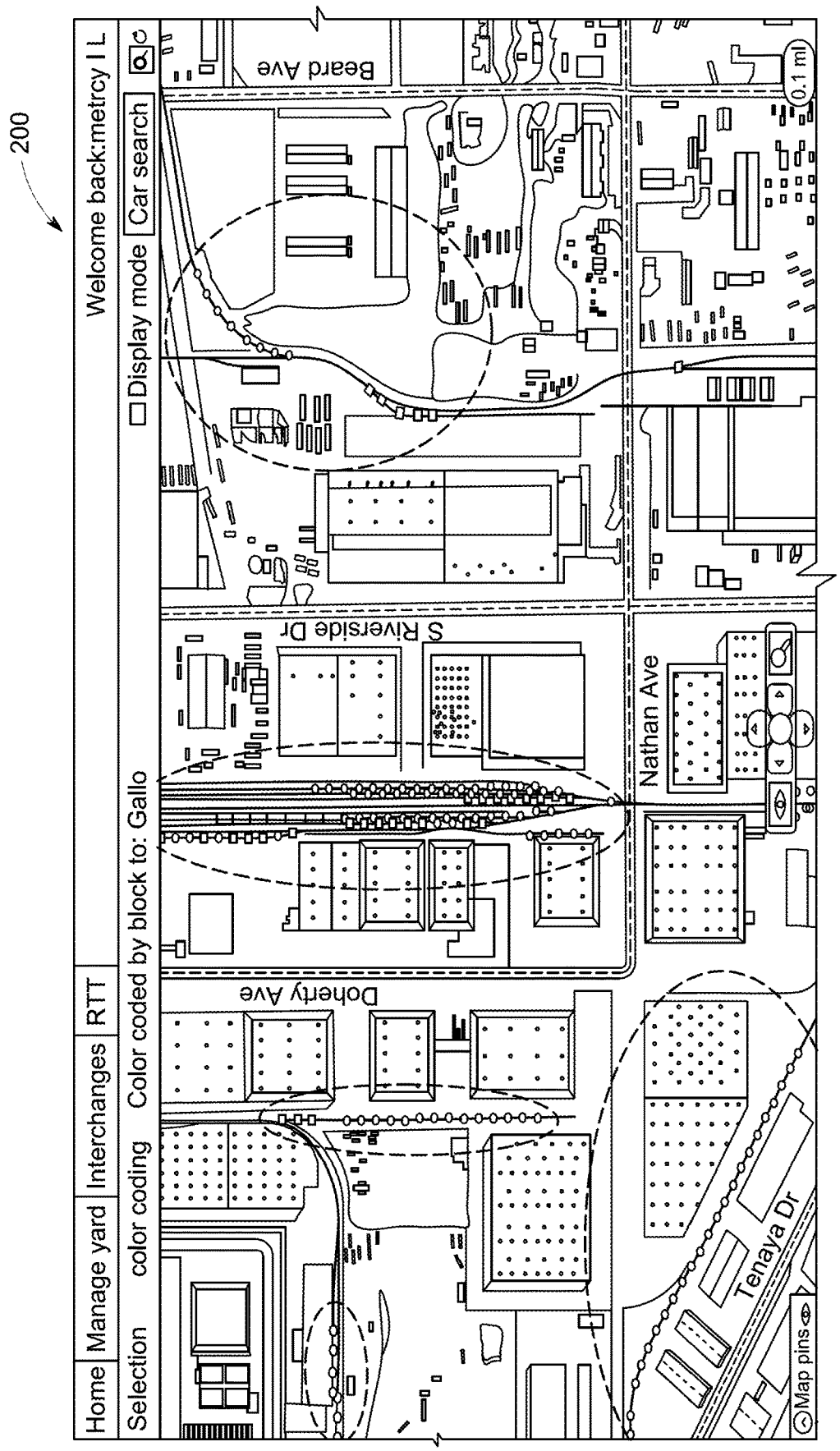
FIGS. 2A and 2B illustrate embodiments of display screens of a map view of a shipper/receiver facility ("S/R facility") generated by the system shown in FIGS. 1A and 1B.
Figure 2B:
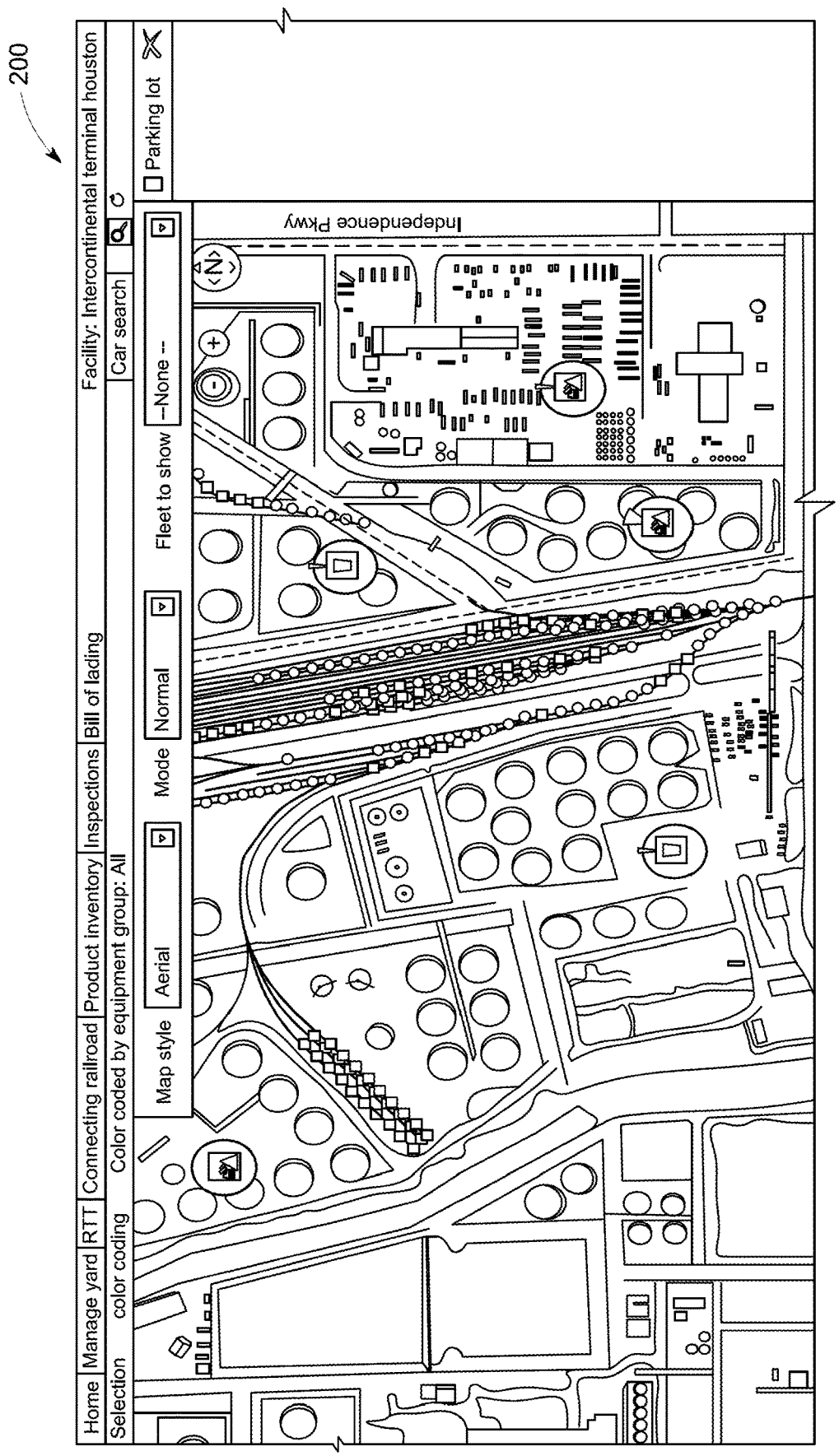

FIG. 2 illustrates a first embodiment of a displayed graphical representation 200 of the S/R facility provided by the equipment control system shown in FIGS. 1A and 1B. The user device may be configured to display the graphical representation(s) on the display screen. The graphical representation may comprise an aerial view (top down view) of the S/R facility. The aerial view may be a map (e.g., map view) of the S/R facility, may be an aerial photographic view (such as a satellite view as in FIG. 2) of the S/R facility, or may combine elements of the two (e.g., a graphical representation of the S/R facility with routes laid over a map of the area, such as in the scenario where the shipper or receiver ships or receives component by vehicles).

In embodiments, the equipment control system is also configured to display equipment information (e.g., vehicle information and storage area information) and/or component information (e.g., raw material information) as part of and/or in conjunction with the displayed graphical representations of the S/R facility. For example, the equipment control system may be configured to display the equipment information and/or the component information as icons overlaid on the displayed aerial view of the S/R facility. The icons provide cues and/or information about the status and/or locations of equipment and/or components, which may include an equipment identification (ID) code, a loaded component type, component availability, component amount, a destination, an origin, a container type, equipment health, equipment status (e.g., in use, in storage, moving, stationary, etc.), maintenance status, and/or load status (loaded with component, unloaded, etc.).

The equipment control system may be configured to generate a displayed refresh icon. The refresh icon allows a user to update the displayed graphical representation to show the current inventory (components and loaded with component, unloaded, etc.) in the facility as overlaid icons (e.g., see the overlaid icons within the dashed ovals of FIG. 2). Also, the inventory (and associated information) may be automatically updated on determined schedule. The updated information may be received by the management controller from the ERP system, in accordance with an embodiment, and processed by the SRMSA to refresh the view on the display screen of the user device. The equipment control system may be configured for a user to also indicate or select (e.g., mark) locations in the map view using marker points. A marker point is a point of interest on the map view that is selected by the user, which stays fixed until cleared by the user, and which may act as a reference point in the equipment control system for performance of one or more functions of the equipment control system. For example, a user may select a location on a map view and, in response to the selection, the equipment control system may generate and communicate signals to a vehicle to automatically move to the selected location. Such functions may include map zoom-in (e.g., generate an enlarged view of the aerial view) and zoom-out (e.g., generate a reduced view of the aerial view), with the zoom-in or zoom-out carried out with reference to the marker point. Another function includes view indexing, e.g., if the user switches to another view and then returns to the view with the marker point, the view with the marker point is centered on the marker point. Another function includes the equipment control system displaying a list of the extant maker points for switching between the views of the marker points based on user selection of the marker points in the list. The equipment control system may be configured to designate the marker points using displayed graphical representations, such as displayed graphical representations of pins (that is, an element displayed on the display that resembles a pushpin). In an embodiment, the equipment control system is configured so that when a marker point is designated by a user (e.g., a pin is placed), the equipment control system zooms in on the pinned location where the user desires to work. To add a new pin, a user may click on an "Add Pin" icon of the window and then click on the location to be pinned. A pop-up window may appear and the user may enter a name for the pin and specify whether the pin should be visible to only the user ("my view") or to all users ("shared view"). A pin may designate a default view such that, when a user goes to the map view, the view will open to that pin. In the map view, a user may switch between pin locations by either selecting a pin from a list in the window, or by clicking on the pin directly on the map (e.g., using a mouse).

Figure 3:
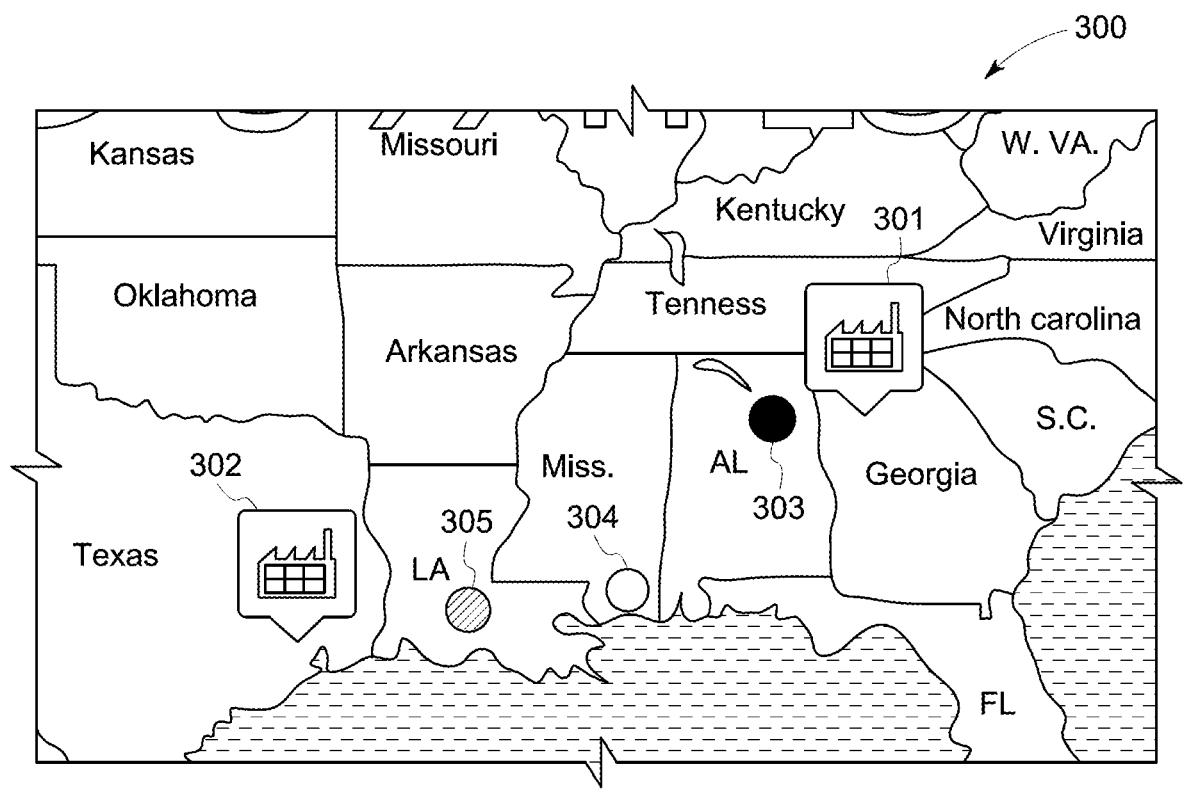
FIG. 3 illustrates another embodiment of a display screen of a map view of a transportation route generated by the system shown in FIGS. 1A and 1B.

FIG. 3 illustrates an embodiment of a displayed map view 300 of a transportation route provided by the equipment control system shown in FIGS. 1A and 1B. The map view may be a graphic representation of a transportation route between two S/R facilities showing icons of equipment carrying component in route between the two S/R facilities. A displayed icon 301 of a shipping facility may indicate on the map view as being located in a first location of the map (Georgia in the example of FIG. 3). A displayed icon 302 of a receiving facility may be indicated on the map view as being located in a second location of the map (Texas in the example of FIG. 3). A first group of vehicles and/or containers en route from the shipping facility to the receiving facility may be indicated by an icon 303, which may be located in a third location of the map (Alabama in this example). A second group of vehicles and/or containers en route from the shipping facility to the receiving facility may be indicated by the icon 304 which may be located in a fourth location of the map (Mississippi in this example). A third group of vehicles and/or containers en route from the shipping facility to the receiving facility may be indicated by the icon 305, which may be located in a fifth location of the map (Louisiana in this example). Color coding of the icons, icon shape, and other icon characteristics may be used to indicate various equipment characteristics including, for example, component type being transported by the equipment and equipment container type. A user may place a cursor over an equipment icon (e.g., using a computer mouse, touchscreen manipulation, or other user input device) to view additional information (e.g., in text format) about the equipment. The additional information may include, for example, weight information about the vehicles and/or containers or component loaded on the vehicles and/or containers, or other way billing information. In one embodiment, there may be an option to toggle to an enhanced mode that addresses disabilities in the user, such as blindness, color blindness, deafness, and the like. Enabling such an option may switch the icons and graphical representations into another mode of presentation—such as to audio, tactile, text, or another mode.

Figure 4:
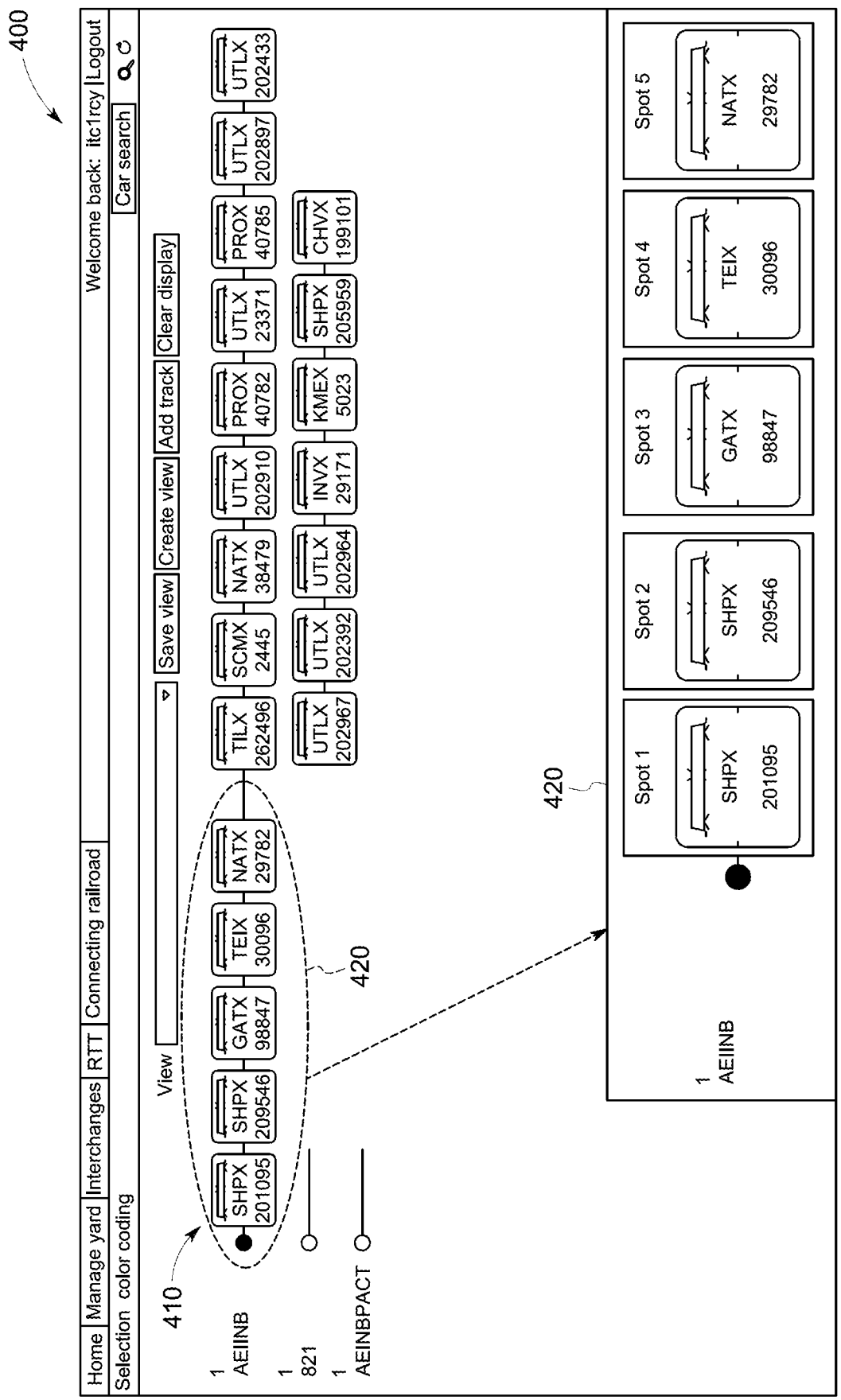
FIG. 4 illustrates another embodiment of a display screen of a plant view of a shipper/receiver facility generated by the system shown in FIGS. 1A and 1B.

FIG. 4 illustrates an embodiment of a displayed plant view 400 of the S/R facility provided by the equipment control system shown in FIGS. 1A and 1B. The plant view may be a graphic representation of a string 410 of equipment and components on a route (e.g., rail cars, trailers, etc., carrying storage containers on a track, road, etc.) in the S/R facility. The string shows the order of the equipment (e.g., rail cars, trailers, etc.) as the equipment appear on the route in relation to each other in various spots. The string may not indicate any particular geographic location(s). A portion 420 of the string 410 may be selectively enlarged for easier viewing in FIG. 4. Views may be created that contain graphical representations of the equipment and components that the user works with or that the user works with most often, for example. This allows a user to more easily manage, for example, rail cars or trailers between routes and storage areas. The plant view may be organized according to views that contain strings of equipment and components specified by the user. A user may group strings together and switch between views by selecting from a "View" drop-down menu.

The system may be configured for a user to edit a view by adding or removing strings and clicking a "Save View" icon. For example, to create a new view, a user may click on a "Clear Display" icon to remove all strings from the window in the plant view. The user may then click the "Add Tracks" icon to select the strings that the user wants to view. The user may select from a list of storage areas that appear, and then click "Done". All strings associated with the selected storage areas will appear in the view. An individual string or storage area may be removed by right-clicking on the string or storage area name and selecting "Remove from this View". When a user is satisfied with a view, the user may click the "Create View" icon. A "New View" pop-up window will appear which may be named by the user. Again, the user may specify for the new view to be visible only to the user (My View) or to all users (Shared View).

FIG. 5 illustrates an embodiment of a displayed list view 500 of the S/R facility provided by the equipment control system shown in FIGS. 1A and 1B. The list view may be a textual representation of equipment and components in a plant. For example, shipping vehicles, routes, and storage areas having component appear in a table format and views may be created that show the storage areas, shipping vehicles, and/or routes that a user desires. The list view may be organized according to views that contain the equipment and components specified by the user and allows a user to view the equipment and components the user works with most often, for example. A user may switch between views by selecting from the "View" drop-down menu. A user may create a new list view by selecting "Clear Selection" from the "View" drop-down menu to remove, for example, all routes and storage areas from the window, select the "Storage Area" and/or "Track" the user wants to view, and click on the "Create View" icon. A "New View" pop-up window will appear and, again, a user may specify a name and visibility of the new view. A user may click the "Update" icon causing, for example, all vehicles associated with a selected storage area and/or route to appear in the view.

Figure 6A:
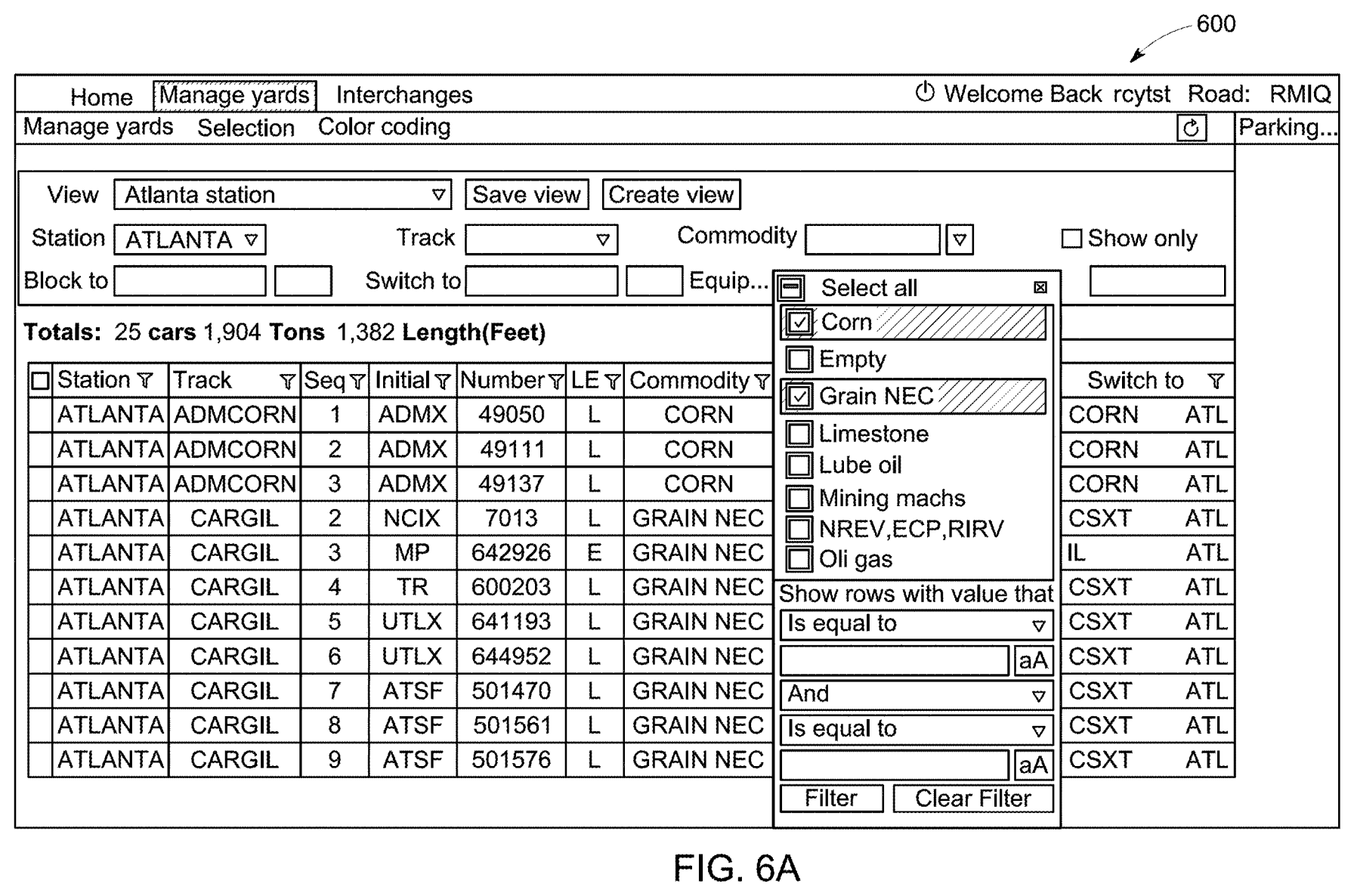

FIG. 6 illustrates an embodiment of data sorting functionality 600 of the equipment control system for sorting and filtering the data of the list view shown in FIG. 5. In accordance with an embodiment, a user may sort the information of the equipment and components in the list view by the values in any column. When a user clicks on a column header, the list may be sorted according to the information in that column. If a user clicks the column header again, the sort will change between ascending and descending order.

The equipment control system may also be configured for a user to also filter the information of the equipment and components that appear in the list view using the values in any column. For example, if a user clicks on a filter icon (e.g., displayed with the appearance of a funnel-like element), a pop-up window appears and the user may select from the values appearing in the column or enter the values directly in the free-form fields. In addition to an "equal to" option, the free-form fields also provide a choice of filtering by values that do or do not begin with, end with, or contain a particular value. Once a user makes a selection, only equipment and components that match the specified value(s) appear in the list.

Figure 7A:
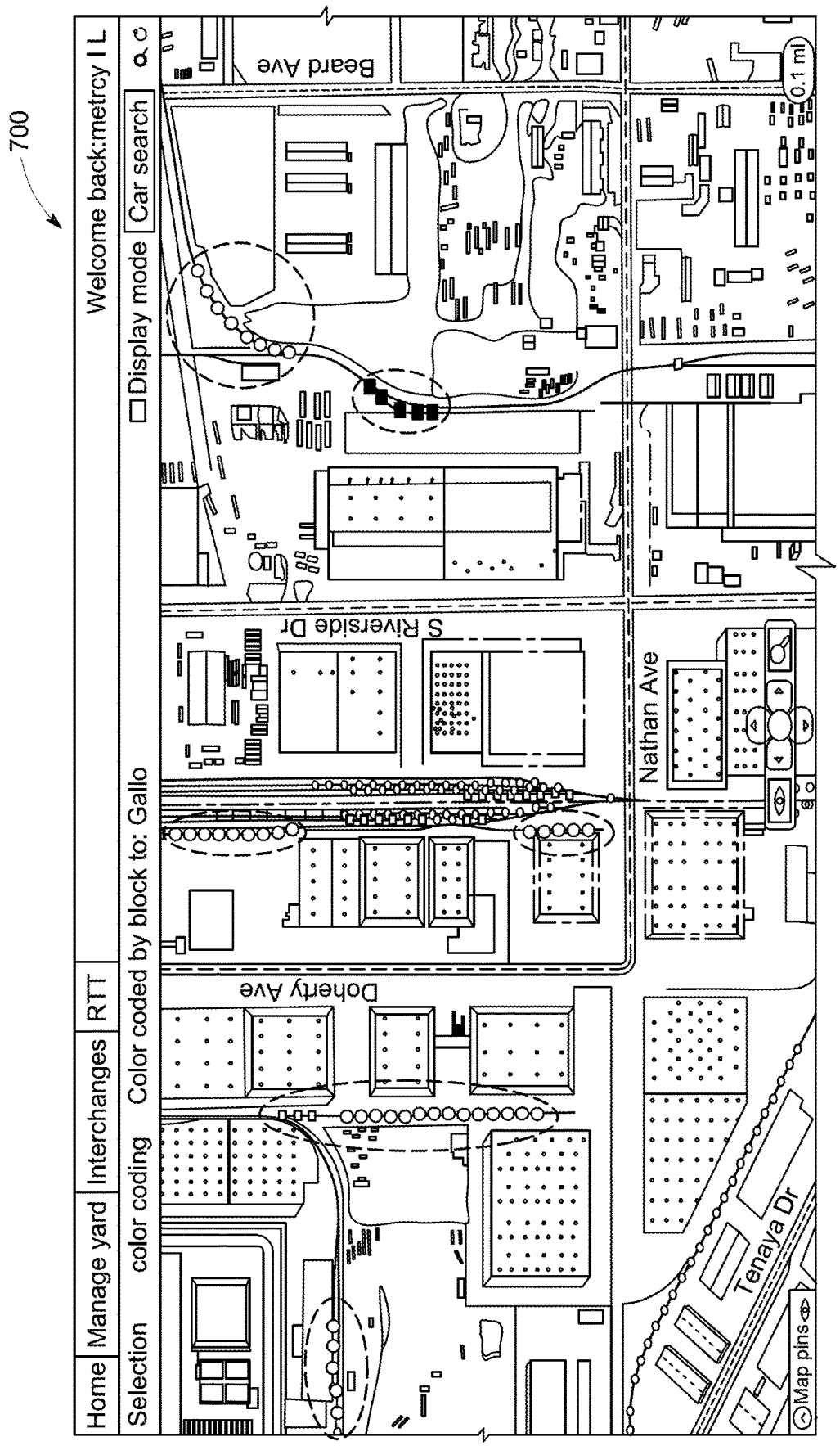
FIGS. 7A and 7B illustrate additional embodiments of display screens showing the color coding of equipment and products in the map view of FIGS. 2A and 2B.
Figure 7B:
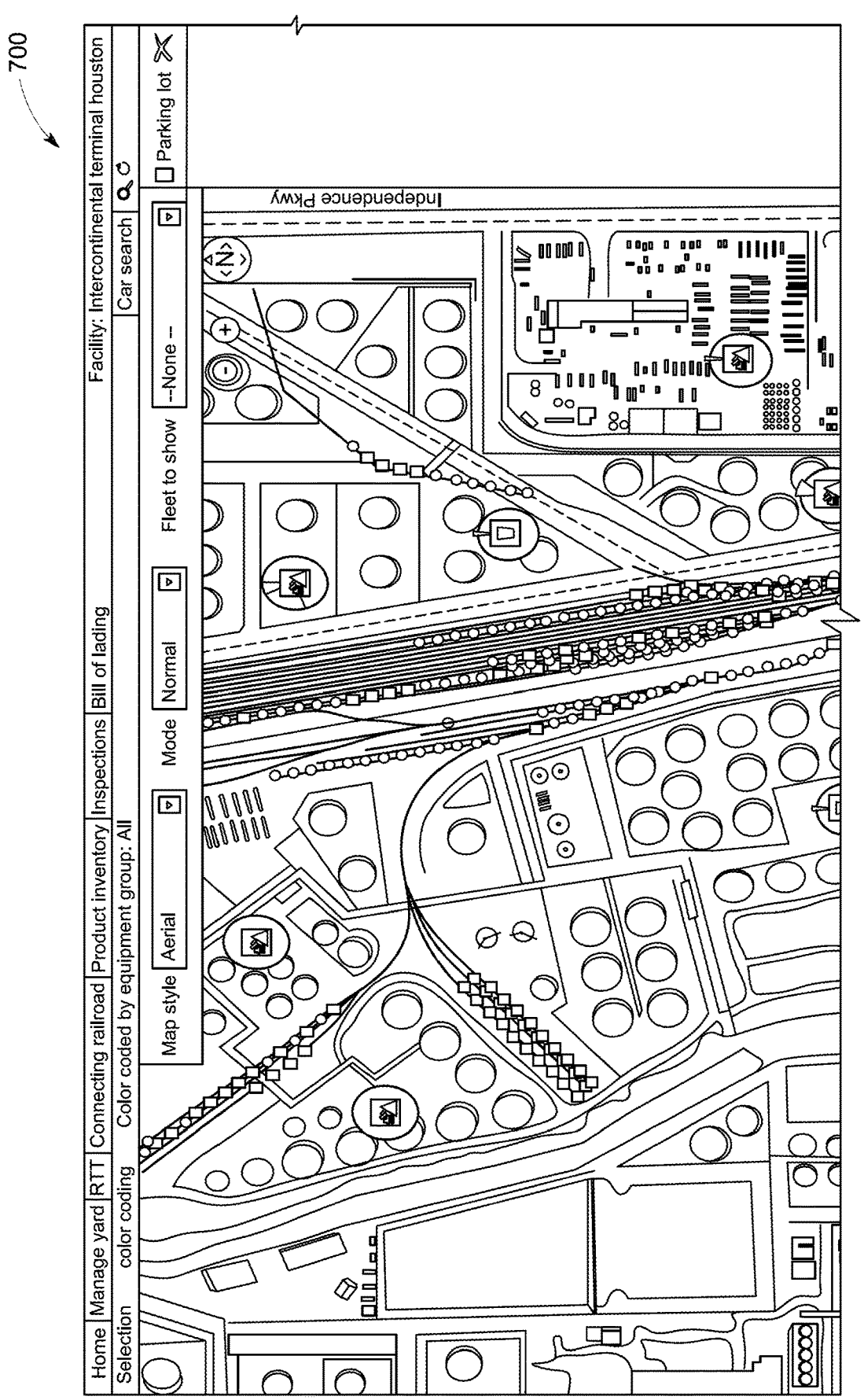
Figure 8:
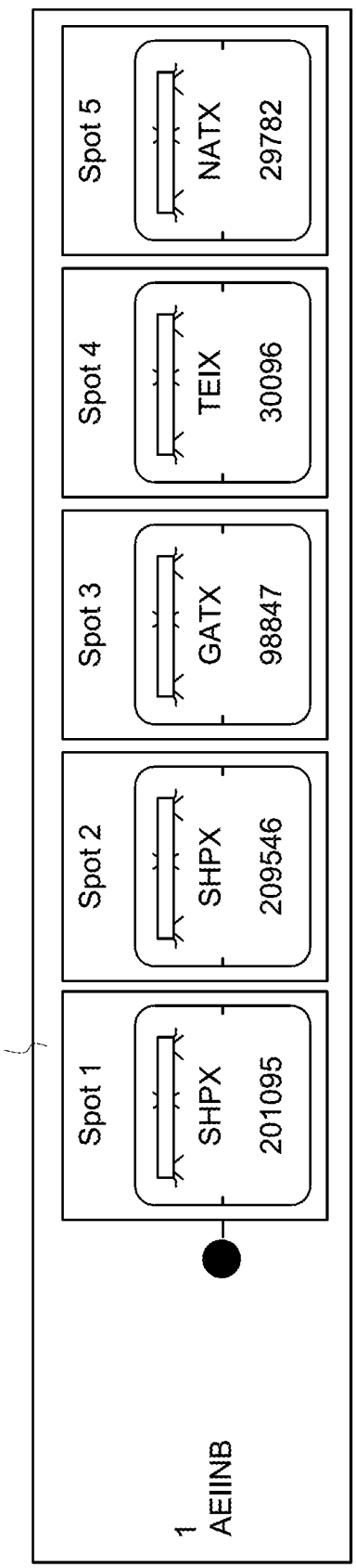
FIG. 8 illustrates one embodiment of a portion of the string of the display screen shown in FIG. 4, showing the color coding of the equipment and products of the portion.
Figure 9A:
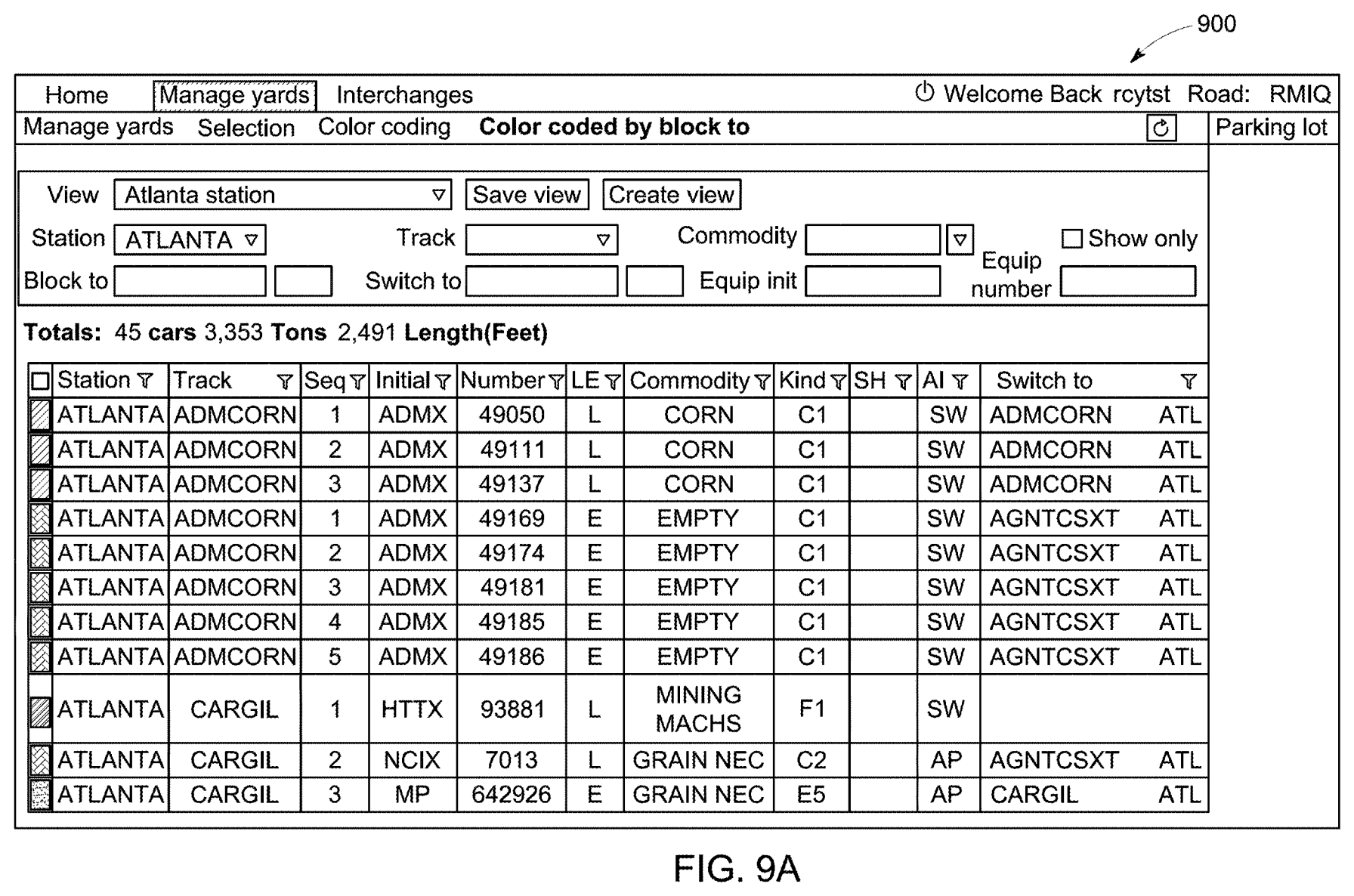

FIG. 7 illustrates an embodiment of a display screen 700 of the equipment control system showing the color coding of graphical representations of equipment and components in the map view shown in FIG. 2. Using a "Color Coding" option, a user may highlight, for example, graphical representations of storage or non-propulsion-generating vehicles (e.g., rail cars, trailers, barges, etc.) or transportation vehicles (e.g., propulsion-generating vehicles, such as locomotives, trucks, tug boats, etc.) on any view by the following designations: "Equipment Group", "Car Kind", "Product", "Hazardous", or "Status". As a result, a user may find particular groups of vehicles quickly by selecting a designation from a "Color Coding" drop-down menu, causing the corresponding vehicles to appear highlighted in the view. The color-coded equipment may be shown in the areas within the dashed white ovals in FIG. 7. Similarly, FIG. 8 illustrates an embodiment of a portion 420 of the string of the displayed view shown in FIG. 4, showing the color coding of the equipment and components of the string portion. FIG. 9 illustrates an embodiment of a displayed view 900 showing the color coding of graphical representations of equipment and components in the list view shown in FIG. 5. FIGS. 3 and 7-9 herein illustrate the color coding in terms of shades of gray. In accordance with an embodiment, however, the color coding may be accomplished with other non-gray scale colors, providing better discernment to the user. Other types of equipment and component coding may be possible as well such as, for example, shape coding of equipment and component icons, intensity coding of equipment and component icons, and flashing coding (e.g., a displayed icon is first displayed and then not displayed in a regular repeating pattern) of equipment and component icons.

Figure 10A:
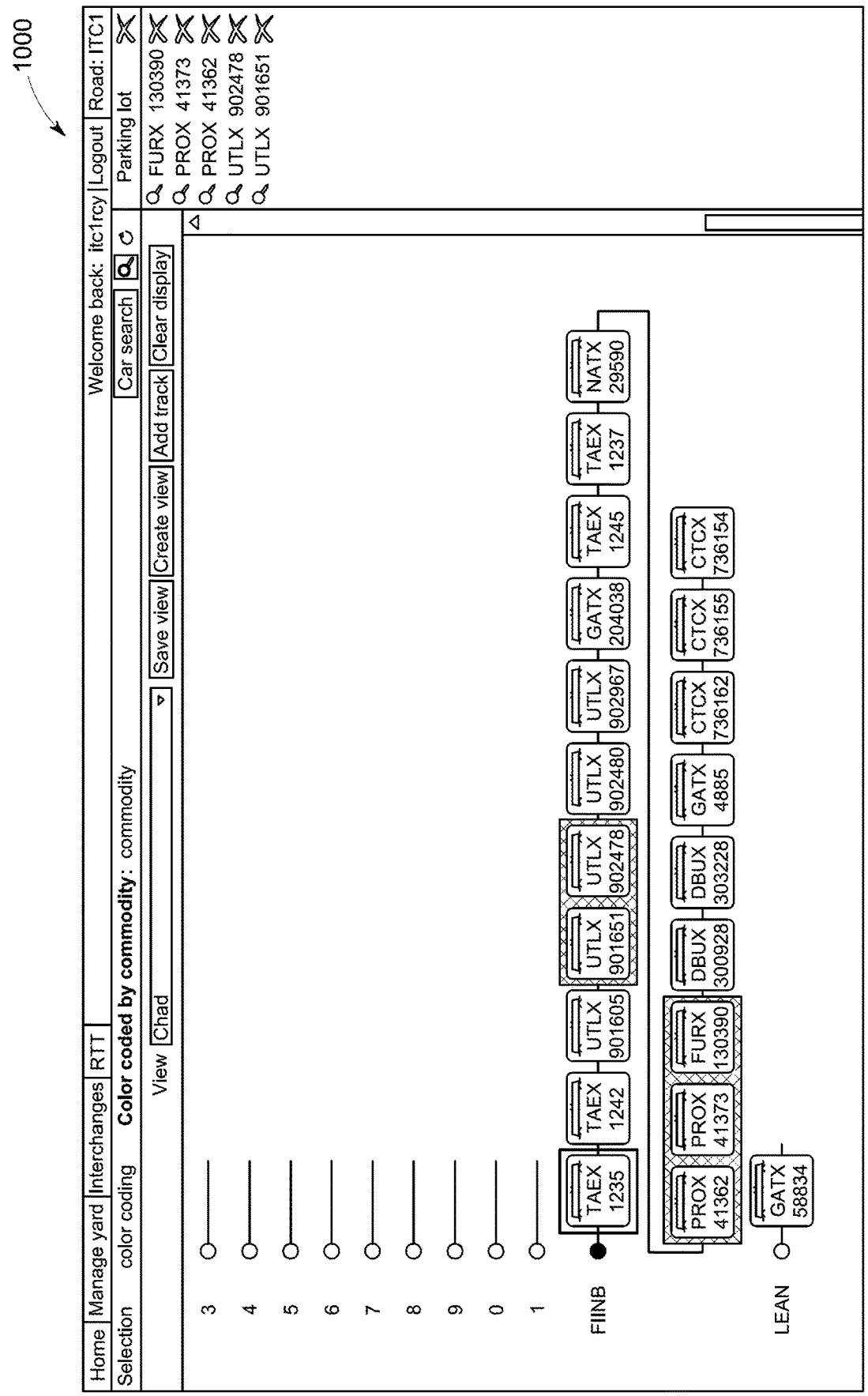
FIGS. 10A and 10B illustrate embodiments of display screens showing a "parking lot" function.
Figure 10B:
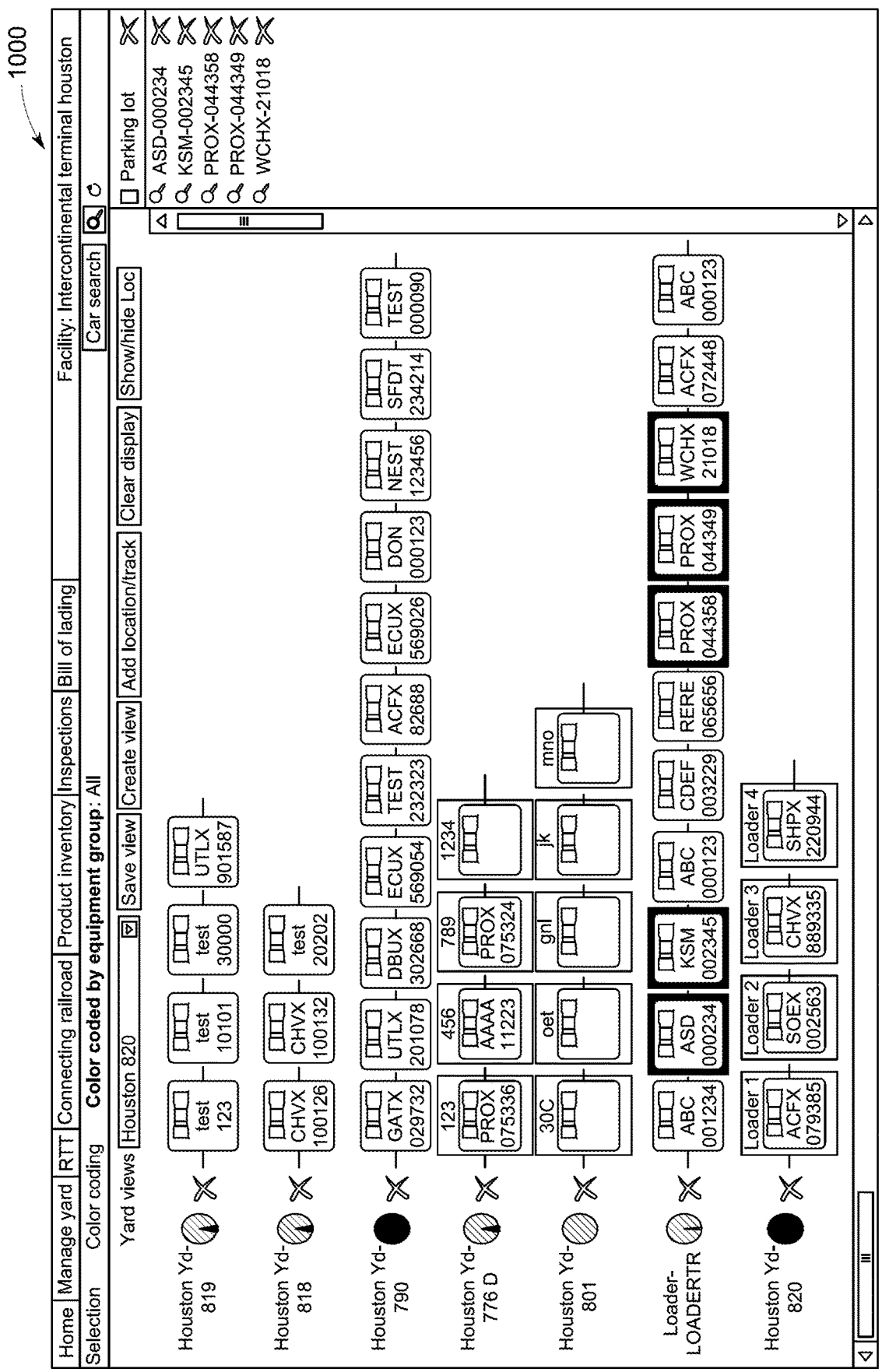

In accordance with an embodiment, the equipment control system may be configured for a user to select shipping vehicles in any view based on a variety of criteria including vehicle identification, location, equipment group, or component, allowing a user to choose groups of vehicles quickly and take action based on the criteria. A parking lot area or holding area may be provided in each view. For example, FIG. 10 shows an embodiment of display screen of the equipment control system, which includes a parking lot function. The parking lot function allows a user to temporarily place a group of graphical representations of vehicles and/or containers, with which the user wants to work, into a designated portion of the display (the parking lot area) where they may wait until the user is ready to act upon them.

To place a graphical representation of a vehicle, or multiple vehicles (e.g., a string), in the parking lot area, a user may select the vehicle(s) and drag and drop the vehicle(s) to the parking lot area in the window. In one embodiment, graphically moving a vehicle to the parking lot area does not make any changes to the vehicle in the equipment control system. Once a group of vehicles are placed in the parking lot area, however, a user may readily select the entire group and edit the corresponding bill of lading information, or move the group of vehicles together within the representation of the S/R facility within the equipment control system. The user may then work with several vehicles that may be currently on different routes or paths, or when the user wants to add multiple vehicles to a vehicle system. For example, responsive to a user moving a graphic icon representative of a propulsion-generating vehicle, the equipment control system can generate signals that are sent to the vehicle (e.g., to a controller of the vehicle). In response to receiving these signals, the vehicle controller may automatically control the vehicle (e.g., control motors and/or steering) of the vehicle to cause the vehicle to automatically move to the user-selected location and/or to move along the user-selected routes.

In accordance with an embodiment, the equipment control system may be configured for a user to select a "Display Mode" check box to make the parking lot area disappear from the displayed window in the map view. This provides the user with more room to work in the view. Furthermore, when in the "Display Mode", the equipment control system may update automatically or be manually refreshed to provide the up-to-date information to the user. The user may draw and edit tracks and storage areas such that the map view will match the setup of the plant operation.

FIG. 11 illustrates an embodiment of another display screen 1100 generated by the equipment control system shown in FIGS. 1A and 1B. The display screen shown in FIG. 11 displays information associated with providing interchange support of equipment (e.g., inbound vehicles) into the S/R facility. For example, the displayed information may include header information of facility, yard, date and time, track (or road or other equipment route), connecting shipper, and so on, along with a selectable list of incoming equipment (e.g., rail cars, trailers, cranes, etc.). The list can include displayed information of sub fleet, equipment identifier ("Number"), information of what the pieces of equipment are carrying, and quantities of what the pieces of equipment are carrying. As part of the user interface, the display screen may include options for a user to modify the information of the incoming equipment, confirm the incoming equipment, or cancellation of any modifying actions.

FIG. 12 illustrates an embodiment of another display screen 1200 generated by the equipment control system of FIGS. 1A and 1B. The display screen shown in FIG. 12 displays information associated with loading equipment (e.g., a railcar, trailer, barge, etc.) within the S/R facility. For example, the display screen may include a loading date and time in the header, and a list of equipment that are to be loaded, or that are being loaded, at or around that time/date. Displayed information of the equipment may include equipment number or other equipment identifier, owner or shipper information, route information of where the equipment currently is located or where the equipment is to be loaded, and modifiable information of components (e.g., type of component and weight or mass of component) being loaded (or to be loaded) onto the equipment.

FIG. 13 illustrates an embodiment of another display screen 1300 generated by the equipment control system shown in FIGS. 1A and 1B. The display screen shown in FIG. 13 displays information associated with a component master list. For example, the component master list may be a displayed list of component information stored in a database (and associable with equipment in others of the displayed screens, such as in FIGS. 11 and 12 as one example), which can be modified via insertion of new components, deletion of existing components, and selection and modification of individual ones of the components, in terms of information about the component such as component name, component description, and whether the component is designated as inactive or active in the system (active meaning currently associable with equipment, and inactive meaning not currently associable with equipment).

FIG. 14 illustrates an embodiment of another display screen 1400 generated by the equipment control system shown in FIGS. 1A and 1B. The display screen shown in FIGS. 1A and 1B shows information associated with an equipment group master list. The equipment group master list may be a displayed list of equipment group information stored in a database (and associable with equipment in others display screens of the displayed screens), which can be modified via insertion of new equipment groups, deletion of existing equipment groups, and selection and modification of individual ones of the equipment groups, in terms of information about the equipment groups such as equipment group name and whether the equipment group is designated as inactive or active in the system.

FIG. 15 illustrates an embodiment of another display screen 1500 generated by the equipment control system shown in FIGS. 1A and 1B. The display screen shown in FIG. 15 displays information associated with an equipment kind master list. The equipment kind master list may be a displayed list of equipment kind information stored in a database (and associable with equipment and/or equipment groups in others of the displayed screens), which can be modified via insertion of new equipment kinds, deletion of existing equipment kinds, and selection and modification of individual ones of the equipment kinds, in terms of information about the equipment kinds such as equipment kind abbreviation, equipment kind description, and whether the equipment kind is designated as inactive or active in the equipment control system.

FIG. 16 illustrates an embodiment of another display screen 1600 generated by the equipment control system shown in FIGS. 1A and 1B. The display screen in FIG. 16 presents information associated with a location (e.g., storage area) master list. For example, the location master list may include, as part of the displayed user interface, user-editable fields for access and modification of associated data records stored in the equipment control system. The fields (and associated data record entries) may include location area, location name, location description, location type, location capacity (minimum and/or maximum capacity of what is stored at the location), designated unit of measure of the capacity, customer, and component.

Figure 17:
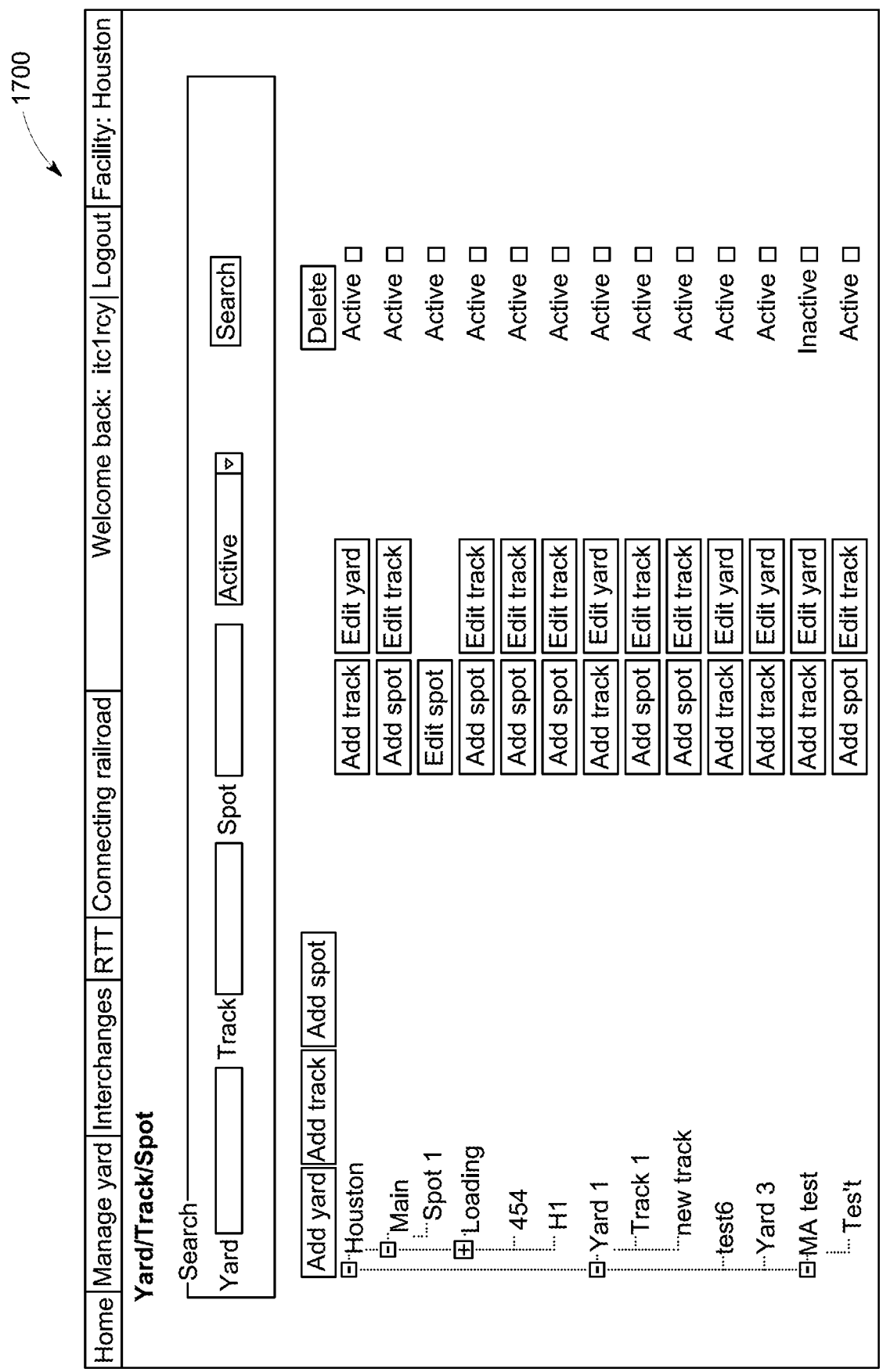
FIG. 17 illustrates one embodiment of a display screen generated by the system shown in FIGS. 1A and 1B for the setup of infrastructure (e.g., a plant/track/spot) within the S/R facility.

FIG. 17 illustrates an embodiment of another display screen 1700 generated by the equipment control system shown in FIGS. 1A and 1B. The display screen in FIG. 17 presents information on the setup of infrastructure (e.g., a plant, a route, and/or a spot) within the S/R facility. For example, the display screen may include, as part of the displayed user interface, search fields for user entry of infrastructure information to search for in the equipment control system (e.g., search by yard, track, or spot), a display of existing infrastructure (e.g., displayed as a nested hierarchy of infrastructure), user-selectable icons for adding or editing infrastructure elements, and user-selectable icons (e.g., check boxes or radio buttons) for activating and inactivating the infrastructure elements.

FIG. 18 illustrates an embodiment of another display screen 1800 generated by the equipment control system shown in FIGS. 1A and 1B for security and user setup. The display screen may include, as part of the displayed user interface, user-selectable options for allowing respective users in one or more designated groups of users to access (or not access) the various functions of the equipment control system.

FIG. 19 illustrates an embodiment of another display screen 1900 generated by the equipment control system shown in FIGS. 1A and 1B. The display screen shown in FIG. 19 presents a color scheme setup of the equipment control system. The display screen shown in FIG. 19 may include, as part of the displayed user interface, one or more user selectable and/or editable fields for selecting a color scheme type (e.g., each color scheme type may be associated with a particular group of equipment, type of component carried on equipment, or the like). The fields in the display screen may be used for assigning various colors to members of the color scheme type. For example, for each component in the equipment control system, the equipment control system may be configured for a user to assign a color that is uniquely associated with that component in the equipment control system.

In accordance with an embodiment, the management controller and the user device may be operable to facilitate the modification of a graphical representation of the S/R facility displayed on a display screen of the user device, facilitate the modification of characteristics of graphical representations of components and equipment located within the S/R facility which may be displayed on the display screen of the user device, and facilitate the movement of graphical representations of components and equipment within the S/R facility on the display screen of the user device as commanded by the user, including the loading and unloading of components onto and off of equipment. The graphical representations and movements may correspond to actual facilities, components, equipment, and the actual characteristics and movements of those components and equipment in the real world. The modification of a graphical representation of the S/R facility may include adding or deleting graphical representations of routes or storage areas within the facility. The modification of graphical representations of components and equipment may include color coding the graphical representations of the components and equipment. The modification of graphical representations or components and equipment may include assigning characteristics to the components and equipment.

Although trains of rail cars are referred to herein in reference to certain embodiments, certain other embodiments may apply to vehicle consists or other vehicle systems. In one embodiment, a vehicle consist or vehicle system is a group of vehicles that are mechanically linked together to travel along a route. Optionally, the vehicles in the consist or system may not be mechanically linked together. For example, vehicles may communicate with each other to coordinate their respective movements so that the vehicles move together along routes without the vehicles being mechanically coupled with each other. Optionally, the vehicles may not communicate with each other to coordinate their movements, but the movements may be determined so that the vehicles move together along routes without the vehicles being mechanically coupled with each other. A rail vehicle consist is one example of a vehicle consist, and a train (e.g., having one or more locomotives for propulsion and one or more rail cars for carrying components and/or passengers and not configured for propulsion) is one example of a rail vehicle consist. Another example of a rail vehicle consist is a set of mining ore carts. Other examples of vehicle systems or consists include several trucks driving alongside or behind each other in a platoon, several aerial drones flying in a swarm or other arrangement, etc. A powered vehicle consist refers to the interaction of two or more propulsion-generating vehicles that may be mechanically, informationally, or otherwise linked together (e.g., logically linked so that the vehicles can coordinate their movements without being mechanically coupled with each other).

In one embodiment, the equipment control system may record equipment and component movement events within the S/R facility. When equipment or component moves in an actual S/R facility, a user of the equipment control system may update the equipment control system to reflect the move. This may be done, for example, by "dragging and dropping" the icon corresponding to the equipment or component in a view displayed on the user device. Equipment and components may come into the S/R facility through an inbound interchange process. In embodiments, the equipment control system is configured so that a user cannot move, place, release, load, or unload equipment or components in the equipment control system until the equipment or components are interchanged to the S/R facility. Equipment and components stay within the S/R facility until a user moves the equipment or components to a serving carrier through an outbound interchange.

Using the equipment control system, simple route-to-route moves may be made within facility limits. Also, "Classifying" a route provides a way to rapidly move vehicles and create history records in a large facility, for example. Furthermore, "Fanning" a route allows a user to move equipment from one route to multiple other routes within a facility. Also, "Resequencing" allows a user to change the order of equipment (e.g., vehicles) on a route. In accordance with an embodiment, the "Classifying", "Fanning", and "Resequencing" functions are implemented as scripts or macros in the equipment control system. Other scripts or macros can be used to automate or aggregate a series of steps that are repeated and therefore to collapse longer routines into a single action (or the equivalent).

In the equipment control system, several move types related to storage are defined that allow a user to move equipment or a component into and out of storage, may be recorded to movement history, and may be used to generate storage billing. Several move types may be provided for recording when equipment or a component may be defective and in need of repair or replenishing. For example, vehicles and/or containers may be marked as "bad allocation request" in the equipment control system and may be flagged on various windows and reports throughout the equipment control system. When the vehicle or container is repaired, the vehicle or container may be moved in the equipment control system off the "bad allocation request" list. Each time a vehicle or container is moved by a user in the equipment control system, a record of the move may be written to a movement history file which may be accessed.

The management controller and associated management software application may include logic that provides an assessment, in comparison to one or more designated criteria, of the movement of equipment and components in the equipment control system as initiated by a user. For example, there may be some equipment movements that may be impossible, highly improbable, or unlikely to take place in a facility. If a user attempts to make such a movement of equipment in the equipment control system, the equipment control system may disallow the move or at least provide an indication to the user that the move may be highly unusual and suggest that the user may want to reconsider the move. Furthermore, movement of equipment and components within the equipment control system made by a user may be verified, for example, against data collected within the actual facility corresponding to the actual movement of the equipment or components (e.g., radio-frequency identification (RFID) data or optical character recognition (OCR) data). The actual movement of equipment and components in the facility may also be time stamped, allowing the equipment control system to perform efficiency analysis of the movement of equipment and components through the S/R facility.

In accordance with an embodiment, the equipment control system allows a user to review and edit shipping and receiving information for any equipment and associated component. For example, basic shipping/receiving information (e.g., bill of lading or waybill information) for a vehicle or other equipment may appear on the screen when a user, for example, hovers a cursor over that vehicle or equipment on the display screen. The S/R information may be edited by right-clicking on the vehicle or equipment, and selecting "Edit S/R Information", for example. Data may then be edited and/or added via a pop-up window. In accordance with an embodiment, data fields include "Customer", "Equipment Group", "Product", "Quantity" and "Seals". Other S/R data fields (e.g., load vehicle, unload vehicle, associate with an allocation request, outbound vehicles, and inspections) may be possible as well, in accordance with various embodiments of the inventive subject matter.

In accordance with an embodiment, the equipment control system allows a user to periodically review vehicle systems delivered to the S/R facility. When the user sees a new inbound vehicle system listed, the user may check the vehicles in that vehicle system and plan for interchanging and switching vehicles as the vehicles may be received. Vehicles of an inbound vehicle system may be officially accepted by the user and moved into inventory in the S/R facility. Vehicles cannot be moved in the equipment control system until the user interchanges the vehicles online, however. After vehicles may be accepted from a vehicle system, the vehicles may be managed automatically or manually via the equipment control system. When a user is ready to deliver vehicles from the S/R facility, a user may transmit the outbound vehicle systems in advance of actual delivery, or transmit the outbound vehicle systems at the time of delivery. Once an outbound interchange is delivered, the vehicles may be tracked and managed along the route to the destination facility.

In one embodiment, the user device has functionality to determine its own location, the current time, and to identify nearby equipment or components via, for example, near field RFID, barcode scanning, manual entry, OCR, or the like. This allows a user to update the equipment control system with an equipment or component location at a particular time. The equipment control system may then compare the gathered information against an assumed location of the equipment or component. Alternatively, using the location of the user device and the assumed location of the equipment or component, the equipment control system may guide a user to the equipment or component.

The equipment control system may indicate certain paths, route sections, or storage areas that may be occupied, or will be occupied, or may be closed (e.g., for repair). The equipment control system may then calculate an optimal path (e.g., in terms of distance, amount of fuel consumed, etc., based on previous movements along different paths) from the current location to a user indicated new location. That path may be checked against the path or route sections that may be unavailable, or may be unavailable during the time such a move of the equipment or component may be intended. In one aspect, the path of travel may be indicated on the user device, and the path may be re-drawn by user input and/or by other rules or constraints applied by the user.

In one embodiment, a future arrival of a vehicle or container may be indicated as well as an estimated time of arrival of that vehicle or container. Thus, the S/R facility may indicate an inbound vehicle system, calculate a breakdown of the incoming containers, and check for existing obstructions on the intended path of the incoming containers so that such obstructions (such as other parked equipment) may be moved prior to the arrival of the vehicle or container.

In an example of a system including at least one embodiment of an inventory workload management (IWM) module, components and/or materials may be tracked by amount and location (e.g., within a facility) using a controller. Equipment and associated locations may additionally be tracked, and allocation requests may be tracked along with statuses associated with such allocation requests. At least these aspects may be mapped. Mapping may include, but may be not limited to, display of a map (e.g., representation of space including aspects facilitating orientation and association with physical locations) and the addition, superimposition, blending, replacement, et cetera of visual aspects to represent components/materials, equipment, and allocation requests according to at least their location and/or status.

In embodiments, the management controller may be used to assign or otherwise associate components, equipment, and allocation requests in combinations facilitating inventory and workload management. Equipment classes may be selected and associated with at least components in addition to the assignment of individual equipment.

Various aspects of the map may be updated in response to actions at the management controller or elsewhere. In embodiments, one or more display screens (e.g., of the controller, of a mobile device, of a computer, of a machine, and others) may display the map.

Production planning may be facilitated according to embodiments of an IWM module. For example, components being tracked may be determined to be required in certain amounts to keep pace with allocation requests, current and/or anticipated demand, equipment capacity and availability, and/or production capacity or over a given period of time. In embodiments, a projected amount of components may be used in determining a production schedule for the component. Projected amounts may be based at least in part on, for example, allocation requests and/or allocation request statuses. In alternative or complementary embodiments, a production schedule may be determined based at least in part on equipment and/or equipment locations. In another alternative or complementary embodiment, a production schedule may be based on a component consumer schedule (e.g., the schedule of a consumer ordering the component).

Various equipment control systems may be used to implement aspects related to IWM modules. In one or more embodiments, an inventory monitor module may be used in systems (e.g., software applications or a facility controller running the software application) to track a component inventory of one or more components (e.g., at a facility).

In embodiments, an equipment monitor module may track an equipment inventory of one or more pieces of equipment (e.g., at the facility). In addition, an order status module may maintain an allocation request record including the allocation requests and associated statuses (e.g., most recent, statuses over time, other information). At least these modules may provide information to a graphical interface module that may virtually represent at least a portion of this information (e.g., on a map). The graphical interface module may represent different amounts of component (and/or equipment or other aspects).

Embodiments of equipment control systems as described herein may include a production output module to determine amounts of components being added to an inventory (e.g., as a result of production). Embodiments may additionally include an equipment capacity module that may determine total capacities, used capacities, unused capacities, and/or alternative utilizations of capacities of one or more pieces of equipment. In another alternative or complementary embodiment, a combination module may combine information (e.g., weight, volume, value, ratio, blending, specification, testing, certification, and others) related to two or more components that may be stored together in combination equipment (e.g., equipment designated to include two or more components simultaneously, equipment designated for mixing or blending components, and so forth).

Embodiments of equipment control systems herein may include various distinct and/or distributed sub-systems, such as enterprise resource systems, controllers (e.g., facility management controller), and/or user devices (e.g., proprietary, commercial/consumer with modified functionality or app installed, and so forth). For example, an enterprise resource system may schedule one or more transfers of inventory (e.g., from a facility). The controller may communicate with at least the enterprise resource system and may direct production and/or control of components/material at the facility. The controller may direct production and/or control based on, for example, the inventory, the transfer of inventory, and locations (e.g., map data) related thereto. The user device may be in communication with at least the controller and receive information there from including at least a resource map that shows location information related to the inventory and the transfer(s). This information may be displayed at the user device (e.g., on a visual display).

In embodiments, maps or other location-based aspects herein may depict a plurality of geographically disparate locations, facilities, entities, et cetera. For purposes of aspects herein, "geographically disparate" may mean around the world, but refers to locations not immediate to or within a facility. Transfers may be shown between geographically disparate facilities on or related to a true map (e.g., of the United States) or a symbolic map (e.g., line drawn between representations of both facilities showing transfer between two facilities, line drawn between representations of both facilities that may be graduated according to time or distance, and so forth).

In embodiments, various aspects may be determined by the enterprise resource system(s), controller(s), user device(s), and/or other modules or sub-module interacting therewith. For example, a time of completion (e.g., when one or more portions of a transfer will reach the destination and be accepted by a recipient) may be calculated for a transfer. Subsequent transfers may be scheduled based on the time of completion or other aspects, permitting a continuous flow of transfers as benefits just-in-time (JIT) or other efficiency-focused production techniques. In complementary or alternative embodiments, the facility management controller (or other modules) may select equipment to retain at least a portion of the inventory (e.g., at the facility).

In embodiments, an IWM module may utilize statistics to forecast and improve aspects related to inventory management or workload management. In an embodiment, statistical information may facilitate the development of high resolution management metrics and estimates that may distinguish between workers, lines, areas, types of components or equipment, et cetera, to ensure accurate and reliable inventory and workload management. For example, a new allocation request may require modification to a production schedule. This allocation request may be assigned to a particular line on a particular shift, which produces at a different rate than other lines and shifts. In addition, the allocation request may be planned for delivery using particular equipment that may be more or less difficult to load and stage than other equipment. Rather than relying on facility-wide or enterprise-wide estimates, an IWM module may use various allocation request information to provide detailed performance information that may be used in at least complex estimates directed toward efficient management.

In another embodiment, a method (e.g., for inventory and workflow management) may include various aspects using a controller, such as receiving one or more component locations of one or more components within a facility, receiving one or more equipment locations of one or more equipment within the facility, receiving an allocation request for at least one of the one or more components, assigning at least a portion of the at least one of the one or more components to at least one of the pieces of equipment to complete the allocation request, and scheduling a fulfillment of the allocation request based one or more designated times associated with one or more operations. The one or more operations may include one or more of receiving, inspecting, cleaning, repairing, maintaining, moving, loading, unloading, transferring, and testing of the one or more components or the one or more pieces of equipment. A map of the facility may be generated that includes representations of the one or more components at the one or more component locations (the one or more pieces of equipment at the one or more equipment locations, and one or more locations associated with the allocation request), and/or visually representing the map with respective visual characteristics on a display screen of a user device in operative communication with the controller. An allocation request status update may be received that is based at least in part on the operations. The map may be updated based on the allocation request status update. A production schedule may be determined for the one or more components based on at least the fulfillment and the allocation request, and/or releasing the at least one of the one or more pieces of equipment for transport based on the fulfillment. One or more production schedules may be further based on a customer schedule or other remote location schedule. An allocation request status update based on the one or more operations may be received, and an alert may be given in response to the allocation request status update.

In an embodiment, a controller (e.g., the management controller) may be configured to receive a component inventory relating to one or more components at a facility, receive an equipment inventory relating to one or more pieces of equipment at the facility, receive a set of allocation requests including one or more component allocation requests, and one or more statuses associated respectively with the one or more component allocation requests (where the statuses include location information describing at least one location associated with the one or more components and the one or more pieces of equipment). The controller may be configured to control generation of a representation of at least a map of the facility including the location information to be displayed on a user device, and may produce a notification based on the location information that prompts one or more operations related to the set of allocation requests. In one embodiment, the controller may modify the component inventory based on the set of allocation requests, and schedule an inventory replenishment based on the set of allocation requests. In alternative or complementary embodiments, the controller may calculate a total storage capacity of at least a subset of the equipment inventory, and may calculate an available capacity of at least the subset of the equipment inventory, where the inventory replenishment may be further based on at least one of the total capacity and the available capacity. In addition, the controller may calculate a fulfillment rate based on at least the set of allocation requests, and/or to schedule a downtime associated with at least a portion of the facility based on the set of allocation requests.

The system may include an ERP system, a controller (e.g., the management controller), and a user device. The ERP system may schedule an allocation request to be fulfilled from an inventory at a facility. The controller may be associated with the facility and may be communicatively linked to the ERP system, and may allocate the inventory to a plurality of equipment at the facility based at least in part on the allocation request. The user device may be communicatively linked to the controller, and may receive from the facility management controller a workflow list based on the allocation request. In addition, the workflow list may include at least one operation that completes the allocation request by causing a portion of the inventory for the allocation request to ship to a remote location (e.g., to a customer), and/or at least one operation that replenishes the inventory based on at least the allocation request. The user device may transmit an update to the workflow list based on activity that modifies at least one of an allocation request status or an inventory status, and/or the ERP system may schedule a subsequent allocation request based on a fulfillment time associated with the allocation request. In addition, the controller may schedule repositioning of at least a portion of the inventory or at least one of the plurality of pieces of equipment based on the allocation request.

Figure 21:
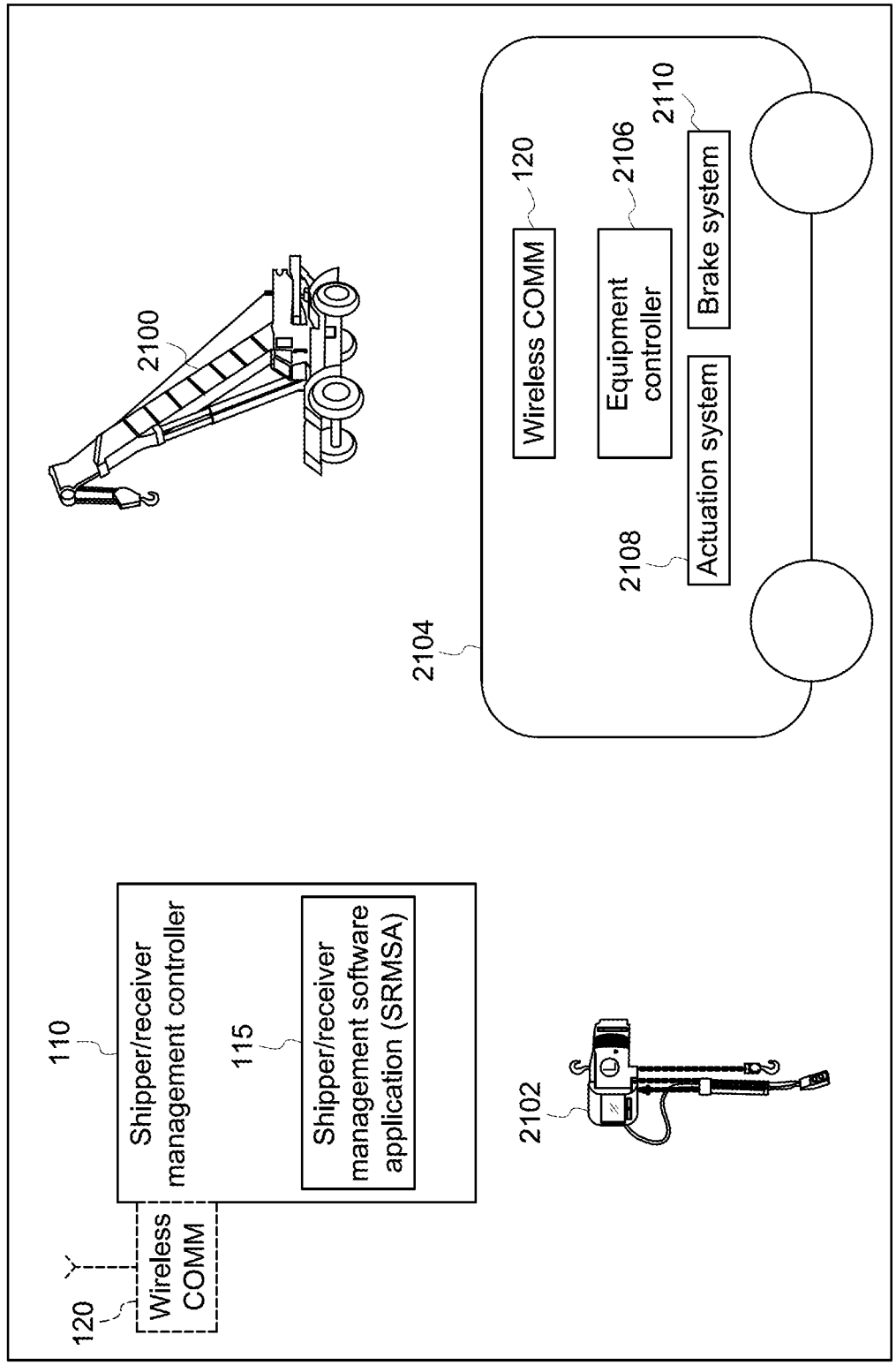
FIG. 21 illustrates one embodiment of the equipment control system shown in FIGS. 1A and 1B controlling operations of various pieces of equipment.

FIG. 21 illustrates one embodiment of the equipment control system shown in FIGS. 1A and 1B controlling operations of various equipment 2100, 2102, 2104. The equipment 2100 represents a moveable crane, the equipment 2102 represents a lift or hoist, and the equipment 2104 can represent any of several other types of equipment. In one embodiment, the details of the equipment 2100, 2102 are represented by the equipment 2104.

The equipment includes a controller 2106, which represents hardware circuitry that includes and/or is connected with one or more processors (e.g., one or more microprocessors, field programmable gate arrays, and/or integrated circuits). The equipment controller communicates with the management controller of the equipment control system via one or more communication links, such as communications between the wireless COMM device of the management controller and a wireless COMM device 120 of the equipment. The COMM devices can represent hardware transceiving circuitry, such as modems, antennas, etc. In one embodiment, the COMM device of the equipment includes or represents a positioning device, such as a global positioning system receiver, that determines the geographic location of the equipment.

In the illustrated embodiment, the equipment includes one or more systems for controlling actuation (e.g., movement) of the equipment, components, materials, etc. These systems may be powered systems (e.g., systems that operate by consuming fuel, receiving electric current, etc.) or unpowered (e.g., wheels that rotate when the equipment is pushed or pulled in a direction by another vehicle or equipment, or by gravity). One example of such a system is an actuation system 2108. The actuation system can represent one or more engines, alternators, generators, motors, etc., that operate to generate tractive effort and propel the equipment, that operate to move one or more components of the equipment (e.g., motors that lift a crane, move ropes or chains of a hoist or pulley, pumps that move fluid through one or more conduits, etc.), or the like. Another example of a system that controls actuation of the equipment includes a brake system 2110. The brake system represents air brakes, motors (e.g., which can brake during regenerative or dynamic braking), etc.

As described above, the equipment controller can track locations, statuses, and other information of equipment. This information can be used by the equipment controller to remotely control movements of the equipment. As one example, a user of the equipment controller can view the location of equipment on equipment routes within an S/R facility, check the status of a vehicle or container or other equipment, and update (e.g., move) the location of the equipment. The user may click and drag, or touch and drag, an icon representative of the equipment 2100, 2102, or 2104 shown by the equipment controller on the display screen of the user device from a first location to a different, second location. The user may repeat this action for multiple, different pieces of equipment to move the various pieces of equipment to one or more different user-selected or default destination locations from one or more different originating or user-selected locations.

Responsive to receiving this input or these inputs from the user, the equipment controller can determine how to direct the selected pieces of equipment (e.g., selected by the user for movement) to move. The equipment controller can identify paths that the different pieces of equipment can travel along to reach the destination locations from the current or originating locations of the equipment. If two or more of these paths cross, then the equipment controller can determine a schedule to cause one piece of equipment to travel through the intersection of the paths at an earlier or later time than another piece of equipment that is traveling through the same intersection. The equipment controller can then generate and communicate control signals (e.g., using the COMM devices) to the corresponding equipment. The equipment controller or controllers can receive these control signals and, based on the directions represented by the signals, autonomously control the actuation systems to move the equipment accordingly. For example, control signals may direct a propulsion-generating vehicle to move a container to a user-selected location, may direct a crane to load or unload cargo from a vehicle, etc.

In one embodiment, the user may select one or more routes, or one or more segments of routes, displayed on the display screen of the user device. Selection of a route or segment of a route may prevent the equipment controller from directing equipment from traveling on the selected route or selected route segment. A user may therefore block off a route or portion of a route, which may occur due to maintenance on the route or route segment, due to a desire to reserve the route or route segment for use by other equipment, etc. The equipment controller may then determine control signals that route the equipment around, but not over, the selected route or route segment and communicate these control signals to the appropriate equipment controllers.

The management controller and associated management software application may include logic that provides an assessment, in comparison to one or more designated criteria, of the movement of equipment and components in the equipment control system as initiated by a user. For example, there may be some equipment movements that may be impossible, highly improbable, or unlikely to take place in a facility. If a user attempts to make such a movement of equipment in the equipment control system, the equipment control system may disallow the move or at least provide an indication to the user that the move may be highly unusual and suggest that the user may want to reconsider the move. Furthermore, movement of equipment and components within the equipment control system made by a user may be verified, for example, against data collected within the actual facility corresponding to the actual movement of the equipment or components (e.g., radio-frequency identification (RFID) data or optical character recognition (OCR) data). The actual movement of equipment and components in the facility may also be time stamped, allowing the equipment control system to perform efficiency analysis of the movement of equipment and components through the S/R facility.

The equipment controller also allows the user to periodically review vehicle systems delivered to the S/R facility. When the user sees a new inbound vehicle system listed (e.g., on the user device), the user may check the vehicles in that vehicle system and plan for interchanging and switching vehicles as the vehicles may be received. The user may select equipment (such as a switch at an intersection between two or more routes) using the user device (e.g., by selecting an icon representative of the switch) and, in response to this selection, the equipment controller may communicate a control signal to the equipment controller of the switch. The equipment controller may direct the actuation system to activate a motor to change a state of the switch and control which route the vehicle travels onto after traveling over the switch.

The user also may remotely move equipment using the user device and equipment controller for make room for inbound equipment. The S/R facility may indicate an inbound vehicle system, calculate a breakdown of the incoming containers, and check for existing obstructions on the intended path of the incoming containers so that such obstructions (such as other parked equipment). The obstructions may be shown to the user on the user device, and the user device may select these obstructions and direct how the obstructions are to be moved. The equipment controller can communicate control signals to the selected equipment (forming the obstructions) to remotely control movement of the selected equipment so that the equipment no longer is an obstruction to the incoming equipment.

The systems and methods described herein allow for a user to track the locations, statuses, and amounts (e.g., inventories) of equipment, components, and/or materials within one or more facilities, such as a S/R facility. The user device and equipment controller may communicate with each other to allow a user to remotely control and move equipment within the facilities to direct equipment to move components and/or materials (e.g., cargo), to move equipment out of the way of other equipment, etc. The equipment controller can remotely control the equipment to allow fewer users to monitor and control the flow of equipment, components, and/or materials in the facilities (e.g., in that not all equipment may require an individual operator onboard or near the equipment to control the equipment). Additionally, the equipment controller can determine efficient paths for the equipment to move in order to reduce the time spent loading, unloading, or otherwise moving cargo between equipment (e.g., vehicles), to reduce the fuel consumed by the vehicles in moving the cargo, and to reduce the wear and tear on the equipment. For example, the equipment controller can determine the shortest paths or shorter paths (than one or more other, or all other, paths) for the equipment to travel along to move the components and/or materials, without colliding with each other. This can improve operation of the equipment in that the equipment does not travel longer distances than needed.

In one example of operation of the equipment control system shown in FIGS. 1A and 1B, the equipment controller can receive locations of components within a facility. These locations can be automatically communicated by COMM devices connected with the components, by scanning devices (e.g., bar code scanners) that read information printed on or attached to the components, and/or input by users. The equipment controller also can receive locations of transportation vehicles (e.g., equipment) within the facility from the vehicles (e.g., from the equipment controllers or COMM devices). Allocation requests for at least some of the components from different remote locations (e.g., customers) may be input into the equipment controller from an outside source, such as a user of the user device. The equipment controller can use some or all of this information to schedule fulfillment of the allocation requests based on designated times associated with one or more operations involved in the fulfillment of the allocation requests. For example, allocation requests for different component may be associated with a designated operation or series of operations that are to be performed to complete the allocation request (e.g., fulfill preparation of the allocation request). These operations can include, by way of example, obtaining designated amounts of two or more materials, moving the materials to a location of mixing (or other preparation) equipment, mixing the materials for a designated period of time using the equipment, allowing the mixed materials to rest for another designated period of time, using other equipment to place the materials or other components into one or more vehicles scheduled for departure at a sufficiently early time to allow for the materials to be delivered to the remote location (e.g., customer or customers) that submitted the allocation request, etc. The different operations can be associated with designated time periods (e.g., workflow times) needed to perform the operations. The time periods may be set by a user of the system and/or may be time periods measured from previous performances of the operations.

The equipment controller can monitor capacities of the equipment to perform the operations involved in enacting the allocation requests. For example, the equipment controller can track locations of the vehicles as the vehicles carry the materials and/or components within the facility while the vehicles enact the allocation requests. The equipment controller remotely control movements of the transportation vehicles in order to enact the allocation requests in one embodiment. The equipment controller can remotely control a vehicle to move about the facility, obtain different components at different locations in the facility, and transport the components within the facility for multiple allocation requests received from different remote locations (e.g., different persons, different entities, different addresses, etc.). This can reduce the time period needed to enact the allocation requests relative to using different vehicles to transport the components for different remote locations.

The equipment controller can select which vehicles obtain and move components within a facility, the sequential order in which one or more vehicles obtain the components, the paths traveled by the vehicles in moving the components, etc., based on transportation costs. The transportation costs can indicate the effort and/or time needed for obtaining and/or transporting components and/or materials (e.g., cargo). For example, the length of time needed to obtain and/or move cargo can be one transportation cost. The amount of fuel consumed during movement of cargo can be another transportation cost. The wear and tear on equipment during movement of cargo can be another transportation cost. The time period that one piece of equipment is idle (e.g., while waiting for another piece of equipment to move) can be another transportation cost. The equipment controller can remotely control equipment in order to reduce or minimize (e.g., relative to other ways of controlling) the transportation costs associated with one or more pieces of equipment, or all equipment, during fulfillment of one or more allocation requests.

In one embodiment, a system includes plural transportation vehicles within a facility and an equipment controller comprising one or more processors and a communication unit operatively coupled to the one or more processors. The communication unit is configured to receive first signals indicative of component locations of components within the facility, second signals indicative of one or more vehicle locations of the transportation vehicles within the facility, and third signals indicative of allocation requests for at least one of the components from different remote locations. The equipment controller is configured to schedule enactment of the allocation requests based on designated times associated with one or more operations involved in the enactment of the allocation requests and to monitor capacities of the transportation vehicles to carry the components within the facility while the transportation vehicles enact the allocation requests. The equipment controller is configured to generate signals for movement control of the transportation vehicles to combine the components for the allocation requests of the different remote locations in at least one of the transportation vehicles. The transportation vehicles are configured to move the components within the facility as combined in the at least one of the transportation vehicles to enact the allocation requests according to the enactment that is scheduled.

Optionally, the one or more operations include one or more of receiving, inspecting, cleaning, repairing, maintaining, moving, loading, unloading, transferring, or testing of at least one of the components or the transportation vehicles. The equipment controller can be configured to generate a map of the facility including representations of the components at the component locations, the transportation vehicles at the vehicle locations, and one or more locations associated with the allocation requests. The equipment controller may be configured to generate the map with visual characteristics representing at least the component locations and the vehicle locations on a display screen of a user device. In one example, the equipment controller also is configured to receive an allocation request status update based on the one or more operations and update the map based on the allocation request status update.

The equipment controller also can be configured to determine a production schedule within the facility for the components based on at least the enactment and the allocation requests. The equipment controller may be configured to determine the production schedule based on a schedule of at least one of the remote locations. The equipment controller optionally can be configured to receive an allocation request status update based on the one or more operations and generate an alert based on the allocation request status update.

In one example, equipment controller is configured to release at least one of the transportation vehicles for transport of at least one of the components based on the enactment that is scheduled. The equipment controller may be configured to communicate a control signal to one or more of the transportation vehicles to remotely control the one or more of the transportation vehicles to combine the components in at least one of the transportation vehicles based on one or more of a loading time for loading the components onto the transportation vehicles or an unloading time for unloading the components from the transportation vehicles.

Optionally, the equipment controller is configured to communicate a control signal to one or more of the transportation vehicles to remotely control the one or more of the transportation vehicles to combine the components in at least one of the transportation vehicles based on a transportation cost at the capacity of at least one of the transportation vehicles.

The system also may include plural first sensors and plural second sensors within the facility. The first and second sensors can be associated with the components and the transportation vehicles, respectively, and can be configured to respectively determine the component locations and the vehicle locations and to generate the first signals and the second signals for communication to the communication unit of the component controller.

In one embodiment, a system includes a communication unit and one or more processors operatively coupled to the communication unit. The communication unit is configured to receive first signals indicative of component locations of components within a facility, second signals indicative of vehicle locations of transportation vehicles within the facility, and third signals indicative of allocation requests for at least one of the components from different remote locations. The one or more processors are configured to schedule enactment of the allocation requests based on designated times associated with one or more operations involved in the enactment of the allocation requests and to monitor capacities of the transportation vehicles to carry the components within the facility while the transportation vehicles enact the allocation requests. The one or more processors are configured to direct at least one of the transportation vehicles to combine the components for the allocation requests of the different remote locations in the at least one of the transportation vehicles. The transportation vehicles can be configured to move the components within the facility as combined in the at least one of the transportation vehicles to enact the allocation requests according to the enactment that is scheduled.

Optionally, the one or more operations include one or more of receiving, inspecting, cleaning, repairing, maintaining, moving, loading, unloading, transferring, or testing of at least one of the components or the transportation vehicles. The one or more processors can be configured to direct a user device to display a map of the facility including representations of the components at the component locations, the transportation vehicles at the vehicle locations, and one or more locations associated with the allocation requests.

The one or more processors may be configured to direct the user device to display the map with visual characteristics representing at least the component locations and the vehicle locations on a display screen of the user device. The one or more processors can be configured to receive an allocation request status update based on the one or more operations and to direct the user device to update the map based on the allocation request status update. The one or more processors can be configured to determine a production schedule within the facility for the components based on at least the enactment and the allocation requests.

In one embodiment, a system includes one or more processors configured to determine locations of components within a facility and capacities of equipment to move the products within the facility. The one or more processors also are configured to schedule movement of the equipment in order to move the components from a location in the facility to one or more vehicles scheduled for outbound travel from the facility. The one or more processors are configured to monitor locations of the equipment and the capacities of the equipment as the equipment moves the components to the one or more vehicles. The one or more processors also are configured to receive input from a user to remotely control movement of the equipment.

Optionally, the one or more processors are configured to direct a user device to display a map of the facility including representations of the equipment, where the one or more processors are configured to receive the input from the user as a user selection and user movement of one or more of the representations, the one or more processors configured to generate a control signal to remotely control the equipment associated with the user selection to move according to the user movement of the one or more representations. The one or more processors can be configured to direct the equipment to combine the components from allocation requests of different remote locations in at least one of the vehicles based on one or more of a loading time for loading the components onto the at least one of the vehicles or an unloading time for unloading the components from the at least one of the vehicles.

With reference to the drawings, like reference numerals designate identical or corresponding parts throughout the several views. However, the inclusion of like elements in different views does not mean a given embodiment necessarily includes such elements or that all embodiments of the inventive subject matter include such elements.

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it may be related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. Moreover, unless specifically stated otherwise, any use of the terms "first," "second," etc., do not denote any order or importance, but rather the terms "first," "second," etc., may distinguish one element from another.

This written description uses examples to disclose the inventive subject matter, and also to enable one of ordinary skill in the art to practice the subject matter, including making and using any devices or systems and performing any incorporated methods. The embodiments described herein may be examples of articles, systems, and methods having elements corresponding to the elements of the inventive subject matter recited in the claims. This written description may enable those of ordinary skill in the art to make and use embodiments having alternative elements that likewise correspond to the elements of the inventive subject matter recited in the claims. The scope of the inventive subject matter thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A vehicle management system comprising:
one or more processors configured to receive location signals from sensors indicating locations of materials and locations of vehicles within a facility, the one or more processors also configured to receive a request signal indicating an allocation request for the materials to create one or more component products,
wherein the one or more processors are configured to generate a map based on the location signals that are received and to monitor a capacity of the one or more vehicles while the allocation request is enacted,
wherein the one or more processors are configured to schedule one or more of the vehicles to enact the allocation request by obtaining the materials and mixing the materials to create the one or more component products,
wherein the one or more processors configured to schedule the one or more vehicles based on a transportation cost at the capacity of the one or more vehicles and based on one or more of: (a) a loading time for loading the materials onto the one or more vehicles or (b) an unloading time for unloading the materials from the one or more vehicles, and
wherein the one or more processors are configured to control movement of the one or more vehicles to mix the materials in at least one of the one or more vehicles based on the transportation cost and one or more of the loading time for loading the materials onto the one or more vehicles or the unloading time for unloading the materials from the one or more vehicles, the one or more vehicles configured to move the materials within the facility and mix the materials to create the one or more component products.

2. The system of claim 1, wherein the one or more processors are configured to automatically control the one or more vehicles to obtain the materials and create the one or more component products.

3. The system of claim 1, wherein the one or more processors are configured to schedule one or more of receiving the materials onboard the one or more vehicles, inspecting the one or more vehicles, cleaning the one or more vehicles, repairing the one or more vehicles, maintaining the one or more vehicles, moving the one or more vehicles, loading the materials onto the one or more vehicles, unloading the materials from the one or more vehicles, transferring the materials between two or more of the vehicles, or testing of at least one of the component products or the vehicles.

4. The system of claim 1, wherein the one or more processors are configured to generate the map to include representations of the locations of the materials and the locations of the vehicles.

5. The system of claim 1, wherein the one or more processors also are configured to receive a request for a status update on fulfillment of the allocation request and to modify the map based on the request for the status update.

6. The system of claim 1, wherein the one or more processors also are configured to determine a production schedule for the one or more component products based at least in part on the allocation request.

7. The system of claim 6, wherein the one or more processors are configured to determine the production schedule based on a schedule of the locations of one or more of the materials.

8. The system of claim 1, wherein the one or more processors are configured to receive a request for a status update on the allocation request and to generate an alert based on the request for the status update.

9. The system of claim 1, wherein the one or more processors are configured to release at least one of the vehicles from the facility for transport of at least one of the one or more component products that is created.

10. A system comprising:
one or more processors configured to receive location signals from sensors indicating locations of materials and locations of propulsion-generating vehicles within a facility, the one or more processors also configured to receive a request signal indicating an allocation request for the materials to create one or more component products,
wherein the one or more processors are configured to enact the allocation request by:
automatically controlling movement of one or more of the vehicles to obtain the materials and move the materials from the locations of the materials to a mixing location for the blending of the materials for the creation of the one or more component products, and
remotely controlling movement of equipment to blend the materials at the mixing location to create the one or more component products
wherein the one or more processors are configured to control the movement of the one or more vehicles to move the materials in at least one of the one or more vehicles based on a transportation cost at the capacity of the one or more vehicles and based on one or more of: (a) a loading time for loading the materials onto the one or more vehicles or (b) an unloading time for unloading the materials from the one or more vehicles.

11. The system of claim 10, wherein the one or more processors are configured to automatically control the movement of the one or more vehicles for one or more of receiving the materials at the one or more vehicles, inspecting the one or more vehicles, cleaning the one or more vehicles, repairing the one or more vehicles, maintaining the one or more vehicles, loading the materials onto the one or more vehicles, unloading the one or more component products from the one or more vehicles, transferring the materials between two or more of the vehicles, or testing of at least one of the component products or the vehicles.

12. The system of claim 10, wherein the one or more processors are configured to direct a user device to display thea map of the facility including representations of the locations of the materials, representations of the locations of the one or more vehicles, and representations of one or more locations associated with the allocation request.

13. The system of claim 12, wherein the one or more processors are configured to receive a request for an allocation status update and to direct the user device to update the map based on the request.

14. The system of claim 13, wherein the one or more processors are configured to generate an alert based on the request for the status update.

15. The system of claim 10, wherein the one or more processors are configured to determine a production schedule within the facility for the one or more component products based at least in part on the allocation request.

16. The system of claim 15, wherein the one or more processors are configured to determine the production schedule based on a schedule of the locations of one or more of the materials.

17. The system of claim 10, wherein the one or more processors also are configured to schedule movement of the equipment to move the one or more component products from the mixing location in the facility to one or more vehicles scheduled for outbound travel from the facility.

18. The system of claim 17, wherein the one or more processors are configured to monitor locations of the equipment and the capacities of the equipment as the equipment moves the one or more component products to the one or more vehicles.

19. The system of claim 10, wherein the one or more processors also are configured to receive input from a user to remotely control movement of the equipment.

20. The system of claim 10, wherein the one or more processors are configured to release at least one of the vehicles from the facility for transport of at least one of the one or more component products that is created.

\* \* \* \* \*